(12) United States Patent
Al-Omari et al.

(10) Patent No.: US 8,898,142 B2
(45) Date of Patent: Nov. 25, 2014

(54) RISK-PREMIUM-BASED DATABASE-QUERY OPTIMIZATION

(75) Inventors: Awny K. Al-Omari, Cedar Park, TX (US); Hansjorg Zeller, Los Altos, CA (US); Tom C. Reyes, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1226 days.

(21) Appl. No.: 12/322,164

(22) Filed: Jan. 29, 2009

(65) Prior Publication Data

US 2010/0191720 A1 Jul. 29, 2010

(51) Int. Cl.
*G06F 7/00* (2006.01)
*G06F 17/30* (2006.01)

(52) U.S. Cl.
CPC .................... *G06F 17/30463* (2013.01)
USPC ............ 707/713; 707/718; 707/719

(58) Field of Classification Search
USPC .......... 707/824, 689, 999.002, 999.104, 707/999.102, 999.101, 713, 718, 719
See application file for complete search history.

(56) References Cited

U.S. PATENT DOCUMENTS

| | | | |
|---|---|---|---|
| 6,012,054 A * | 1/2000 | Seputis | 702/180 |
| 6,353,826 B1 * | 3/2002 | Seputis | 1/1 |
| 6,434,545 B1 * | 8/2002 | MacLeod et al. | 1/1 |
| 7,548,905 B2 * | 6/2009 | Burger et al. | 1/1 |
| 2006/0212429 A1 * | 9/2006 | Bruno et al. | 707/3 |
| 2007/0162425 A1 * | 7/2007 | Betawadkar-Norwood et al. | 707/2 |
| 2007/0226178 A1 * | 9/2007 | Ewen et al. | 707/2 |
| 2008/0010240 A1 * | 1/2008 | Zait | 707/2 |
| 2008/0104014 A1 * | 5/2008 | Burger et al. | 707/2 |
| 2009/0106306 A1 * | 4/2009 | Das et al. | 707/103 R |
| 2009/0171921 A1 * | 7/2009 | Kirk et al. | 707/4 |
| 2010/0125565 A1 * | 5/2010 | Burger et al. | 707/713 |

* cited by examiner

*Primary Examiner* — Syling Yen
*Assistant Examiner* — Eliyah S Harper

(57) ABSTRACT

Embodiments of the present invention are directed to query-optimization methods and systems that employ risk premiums assigned to database operations in order to increase the robustness and reliability of the evaluation and selection of query-execution plans for executing high-level database queries. Using risk-premium estimates, selection of query-execution plans that include potentially inefficient database operations and inefficient database-operation-execution sequences, often selected by currently available query-optimization methods and systems, are avoided.

17 Claims, 23 Drawing Sheets

PARTS (102)

| PID | PART NO | COST | SID | TIME | QTY |
|---|---|---|---|---|---|
| 361 | 7708A | 10.25 | 88 | 28 | 50 |
| 301 | 7708A | 10.65 | 83 | 14 | 10 |
| 100 | 7613 | 100.50 | 88 | 14 | 50 |
| 107 | 7613 | 125.60 | 83 | 4 | 10 |
| 213 | 7613 | 150.18 | 75 | 1 | 1 |
| 350 | 8123B | 35.16 | 17 | 24 | 20 |
| 280 | 8123B | 34.16 | 16 | 20 | 20 |
| 156 | 8123B | 70.00 | 121 | 2 | 1 |
| 299 | 181 | 1009.17 | 65 | 2 | 1 |
| 330 | 181 | 1000.00 | 66 | 1 | 1 |
| 110 | 1765B | 126.14 | 50 | 1 | 1 |

```
CREATE TABLE PARTS                     116
( PID       SMALLINT,
  PARTNO    CHAR(10),
  COST      MONEY,
  SID       SMALLINT,
  TIME      SMALLINT,
  QTY       INTEGER
);
```

Figure 1A

SUPPLIER (104)

| SID | NAME | ADDRESS | CITY | STATE |
|---|---|---|---|---|
| 88 | BOB'S GEAR | 121 MAIN | SEATTLE | WA |
| 75 | JERRY'S GEAR | 5 APPLE ST. | HOUSTON | TX |
| 121 | ACME | 3121 WEST AVE. | PALO ALTO | CA |
| 66 | DISCOUNT STUFF | 99 JEFFERSON | ORANGE | NJ |
| 50 | PRICEY STUFF | 13 PEACH | BOSTON | MA |
| 83 | FRED'S GEAR | 705 SEROUND | DENVER | CO |
| 65 | REASONABLE STUFF | 105 FIRST | PORTLAND | OR |
| 17 | SARAH'S SEAL | 1111 UNIVERSITY | MINNEAPOLIS | MN |
| 16 | BEN'S SEAL | 13 BAY DRIVE | TACOMA | WA |

```
CREATE TABLE SUPPLIER                  118
( SID       SMALLINT,
  NAME      VARCHAR(30),
  ADDRESS   VARCHAR(100),
  CITY      VARCHAR(20),
  STATE     CHAR(2),
);
```

Figure 1B

PARTS X SUPPLIER

| PID | PART NO | COST | SID | TIME | QTY | NAME | ADDRESS | CITY | STATE |
|---|---|---|---|---|---|---|---|---|---|
| 361 | 7708A | 10.25 | 88 | 28 | 50 | BOB'S GEAR | 121 MAIN | SEATTLE | WA |
| 301 | 7708A | 10.65 | 83 | 14 | 10 | FRED'S GEAR | 705 SECOND | DENVER | CO |
| 100 | 7613 | 100.50 | 88 | 14 | 50 | BOB'S GEAR | 121 MAIN | SEATTLE | WA |
| 107 | 7613 | 125.60 | 83 | 4 | 10 | FRED'S GEAR | 705 SECOND | DENVER | CO |
| 213 | 7613 | 150.18 | 75 | 1 | 1 | JERRY'S GEAR | 5 APPLE ST | HOUSTON | TX |
| 350 | 8123B | 35.16 | 17 | 24 | 20 | SARAH'S SEAL | 1111 UNIVERSITY | MINNEAPOLIS | MN |
| 280 | 8123B | 34.16 | 16 | 20 | 20 | BEN'S SEAL | 13 BAY DRIVE | TACOMA | WA |
| 156 | 8123B | 70.00 | 121 | 2 | 1 | ACME | 3121 WEST AVE | PALO ALTO | CA |
| 299 | 181 | 1009.17 | 65 | 2 | 1 | REASONABLE STUFF | 105 FIRST | PORTLAND | OR |
| 330 | 181 | 1000.00 | 66 | 1 | 1 | DISCOUNT STUFF | 99 JEFFERSON | ORANGE | NJ |
| 110 | 1765B | 126.14 | 50 | 1 | 1 | PRICEY STUFF | 13 PEACH | BOSTON | MA |

— 602

```
SELECT  P.*,S.NAME,S.ADDRESS,S.CITY,S.STATE
FROM    PARTS P, SUPPLIER S
WHERE   P.SID = S.SID
```

Q: WHICH CITIES CURRENTLY HAVE NO SUPPLIERS WHO SUPPLY
PARTS THAT EACH COST MORE THAN $5000 AND HAVE
AVERAGE DELIVERY TIMES FOR PARTS COSTING MORE THAN
$5 AND LESS THAN $1000 OF LESS THAN 21 DAYS?

1102

```
SELECT DISTINCT CITY FROM SUPPLIER  S1
WHERE NOT EXISTS
      (SELECT SID FROM PARTS
        WHERE SID = S1, SID
        AND COST > 5000)

AND  21    >
      (SELECT AVG(TIME) FROM SUPPLIER S2, PARTS P
        WHERE S2.SID = P.SID
        AND S1.CITY = S2.CITY
        AND P.COST > 5
        AND P.COST < 1000);
```

Problem query: Count the distinct number of people paid in a set of months

SQL query:

2002 —
```
select P.AGENCY, P.PROD, COUNT(distinct P.SSN ||
D.MONTH_NUMBER || D.YEAR_NUMBER) as Cases,
d.MONTH_YEAR
from PAY P, DIM_DUE D
where (P.DUE = D.DUE)
and ( D.MONTH_YEAR in
('APR 2005', 'AUG 2005', 'DEC 2005', 'FEB 2006', 'JAN 2006', 'JUL
2005', 'JUN 2005', 'NOV 2005', 'SEP 2005') )
group by P.AGENCY, P.PROD, D.MONTH_YEAR
```

Payment Fact Table (PAY)                          2004

| Column Name | Data Type | Nullable | COMMENTS |
|---|---|---|---|
| SSN | CHAR(8 Bytes) | No | Social Security Number |
| DUE | DATE | No | Due Date |
| PROD | CHAR(5 Bytes) | No | Product Code |
| AGENCY | CHAR(2 Bytes) | No | Agency Code |

...

Date Dimension Table (DIM_DUE)    2006

| Column Name | Data Type | Nullable | COMMENTS |
|---|---|---|---|
| DUE | DATE | No | Calendar Date |
| MONTH_NUMBER | VARCHCHAR2(2 Bytes) | Yes | Month Number |
| MONTH_YEAR | VARCHCHAR2(8 Bytes) | Yes | Month and Year |
| YEAR_NUMBER | VARCHCHAR2(4 Bytes) | Yes | Year number |

2008

| Table name | Description | Row size | Number of rows |
|---|---|---|---|
| PAY | Payment fact table | 120 bytes | 11 billion |
| DIM_DUE | Period dimension table | 34 bytes | 3650 |

RISK-PREMIUM-BASED DATABASE-QUERY OPTIMIZATION

TECHNICAL FIELD

The present invention is related to database query optimization and, in particular, to methods and systems for including risk premiums for database operations within a query-execution plan in order to increase the robustness of query-planning decisions.

BACKGROUND OF THE INVENTION

At a fundamental level, all computer systems, including the initial primitive vacuum-tube-based computer systems developed in the 1940's, are data-storage machines which execute symbol-transformation operations on stored data. Initially, data was stored in small, volatile electronic memories within computer systems and on punched cards input to computer systems. As the capabilities of computer systems, and uses to which computer systems were put, rapidly expanded, a wide array of different types of volatile and non-volatile data-storage components were developed for computer systems, as well as computational subsystems and logical entities to facilitate creation, storage, retrieval, alteration, input, and output of data. Ultimately, separate database-management systems were developed to provide even higher-level database-management functionality.

Currently, very complex and highly capable database-management systems of a variety of different types are commercially available for managing data on a broad range of computer systems from personal computers all the way up to highly complex, distributed computer systems in which data is stored and managed over large numbers of computer systems and mass-storage systems interconnected by a variety of different communications media. Relational-database-management systems, based on a relational algebra that provides relatively simple and logical constructs and algebraic operations on those constructs, were initially developed in the late 1960's and 1970's, and continue to provide useful, flexible, and powerful database management in today's sophisticated, highly-distributed computing environments. Database administrators and users employ schema-development and schema-management commands to create an organizational framework for data and access data through query-language commands. The types of queries that may be executed may range from simple record retrieval to very complex queries requiring access and analysis of the contents of numerous different entities stored within a database, as well as creation of temporary, intermediate entities. There are often many different equivalent ways to express a given query, and there are generally a very great many different ways to decompose a query expressed in a high-level query language into fundamental database operations that are carried out by the database-management system to execute the query. The speed at which a particular query can be executed may vary greatly depending on which low-level database operations are chosen for to implement execution of a query and on the execution sequence of the low-level database operations. Query optimization is a field concerned with optimizing translation of high-level query-language queries into an efficient execution of a set of low-level operations. Despite enormous efforts in query-optimization research and development, there are still cases in which the query-execution plans produced by query optimizers may inadvertently lead to extremely time-inefficient query execution. Researchers and developers of database-management systems, vendors of database-management systems, manufacturers and vendors of computer hardware, and, ultimately, users of database-management systems and applications that interface to database-management systems continue to seek better query optimization techniques in order to optimize query-execution times and to meet other specified constraints that arise in the computational environments in which database-management systems operate.

BRIEF DESCRIPTION OF THE DRAWINGS

FIGS. 1A-B show two relational-database tables used, in part, as a context for describing embodiments of the present invention.

FIG. 6 illustrates a join operation used in constructing queries.

FIG. 11 illustrates a database query.

FIGS. 20-22 provide a real-world example of the pitfalls of current query-execution-plan evaluation.

DETAILED DESCRIPTION OF THE INVENTION

Figure 2:
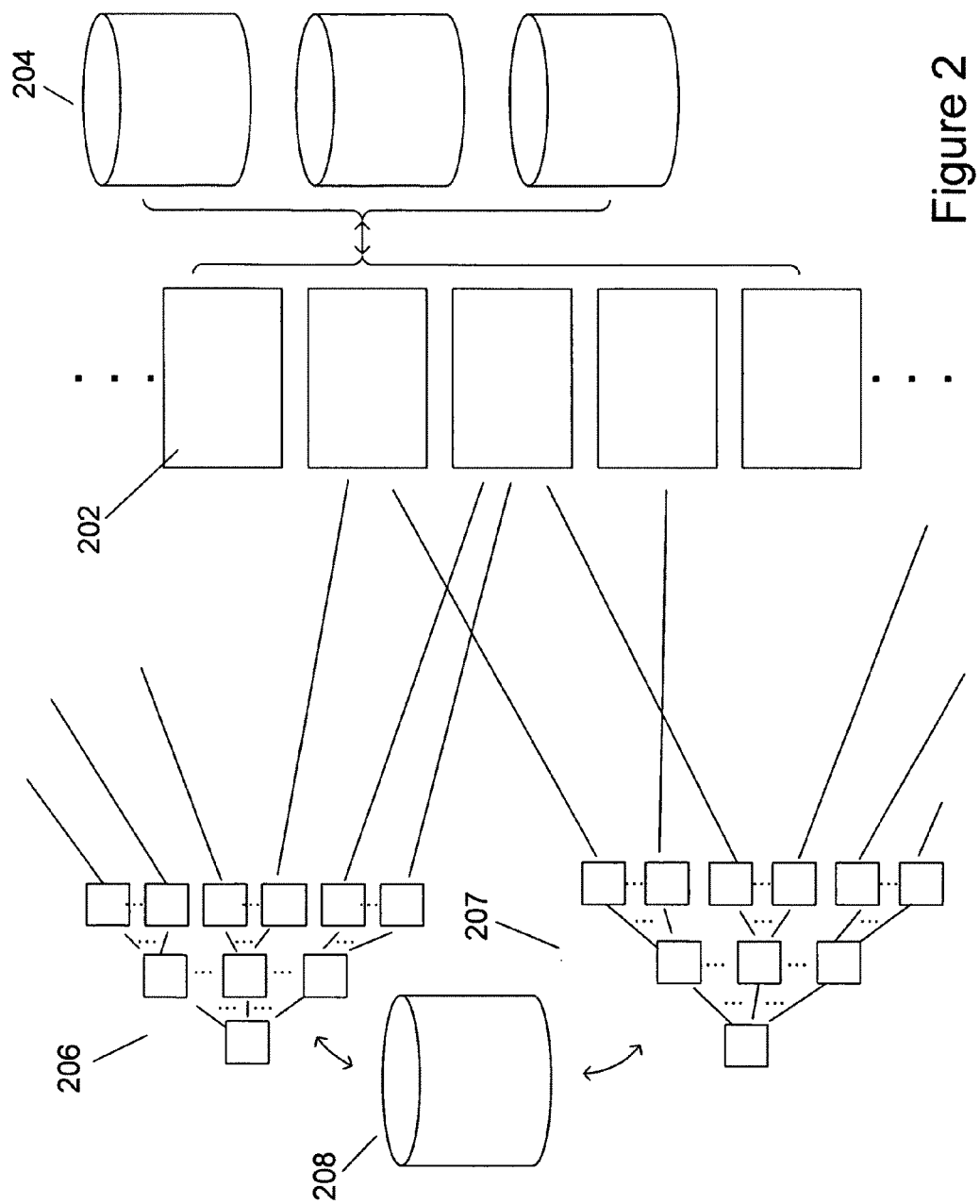
FIG. 2 illustrates implementation of a relational-database table.

Embodiments of the present invention are directed to query-optimization methods and systems that employ risk premiums assigned to database operations in order to increase the robustness and reliability of the evaluation and selection of query-execution plans for executing high-level database queries. Using risk-premium estimates, selection of query-execution plans that include potentially inefficient database operations and inefficient database-operation-execution sequences, often selected by currently available query-optimization methods and systems, are avoided. Although the methods and systems of the present invention are applicable to a variety of different types of database systems and database-query optimizers, the present invention is described, below, in the context of relational database systems and relational-database query optimization.

FIGS. 1A-B show two relational-database tables used, in part, as a context for describing embodiments of the present invention. A relational database table is a logical construct that represents data stored in a database-management system. FIG. 1A shows the relational database table PARTS 102 and FIG. 1B shows the relational database table SUPPLIER 104. A relational database table includes columns, such as columns 106-111 of the table PARTS, and rows, including row 112 of the table PARTS, the first of 11 rows in the table PARTS as shown in FIG. 1A. The columns correspond to attributes, and the rows correspond to different data objects or entities stored within the database, each data object or entity characterized by attribute values. The rows may be considered to be records, with the columns describing the fields within each record. Columns have data types that indicate the type of data used to store attribute values for the attributes corresponding to the columns. The table PARTS includes the columns (1) PID, the identifier of a part; (2) PARTNO, a part number for the part; (3) COST, the per-item cost of the part; (4) SID, the identifier for the supplier of the part; (5) TIME, the average number of days that lapse between ordering the part and receiving the part; and (6) QTY, the minimum number of parts that must be ordered from the supplier in an order. The table SUPPLIER 104 includes the columns: (1) SID, an identifier for a supplier; (2) NAME, the name of the supplier; (3) ADDRESS, the address of the supplier; (4) CITY, the city in which the supplier is located; and (5) STATE, the state in which the supplier is located. The table SUPPLIER 104 in FIG. 1B includes nine different suppliers. The columns SID in the PARTS and SUPPLIER tables provide a link between the two tables. Thus, the first row 112 of the PARTS table represents a particular part that can be ordered from a supplier with supplier ID 88, and information about that supplier can be found in the row in the supplier table with SID equal to 88. FIGS. 1A-B also include the Structured Query Language ("SQL") commands 116 and 118 that specify creation of the PARTS table and SUPPLIER table, respectively.

While tables can be created and managed using SQL entered through any of various SQL-processing interfaces, the actual physical tables are complex computational objects stored within one or more computer systems. FIG. 2 illustrates implementation of a relational-database table. The rows of the relational-database table are generally stored both in memory blocks, such as memory block 202 in FIG. 2, within one or more computer systems as well as on one or more mass-storage devices, such as mass-storage device 204. Rows are continuously read into memory from the mass-storage devices and written from memory back to the mass-storages devices. Rows are read into memory in order that various commands can be executed on, or using, the data contents of rows. However, relational-database tables are often far too large to be read entirely into memory, and are therefore swapped between mass-storage devices and memory just as an operating system swaps the contents of virtual memory between electronic memory and mass-storage devices. The values of the attributes for each data entity stored in a table, or, in other words, the contents of the columns for a given row, are encoded as binary data stored with electronic memory and/or on mass-storage devices. Rows may be sequentially stored in memory blocks, or may be stored across memory blocks in more complex storage schemes. In addition, the rows of a table are commonly indexed by one or more indexes 206-207. Indexes may be hierarchical tree-like indices, as shown in FIG. 2, or may involve other types of data structures, and are associated with corresponding routines that use the index data structures for locating rows, for inserting rows, and for other operations performed on rows. Like the rows of the table, the indexes may also be stored both in memory as well as on one or more mass-storage devices 208, and may be continuously read into memory for the mass-storage devices and written from memory back to the mass-storage devices as needed for supporting index-based operations.

Figure 3:
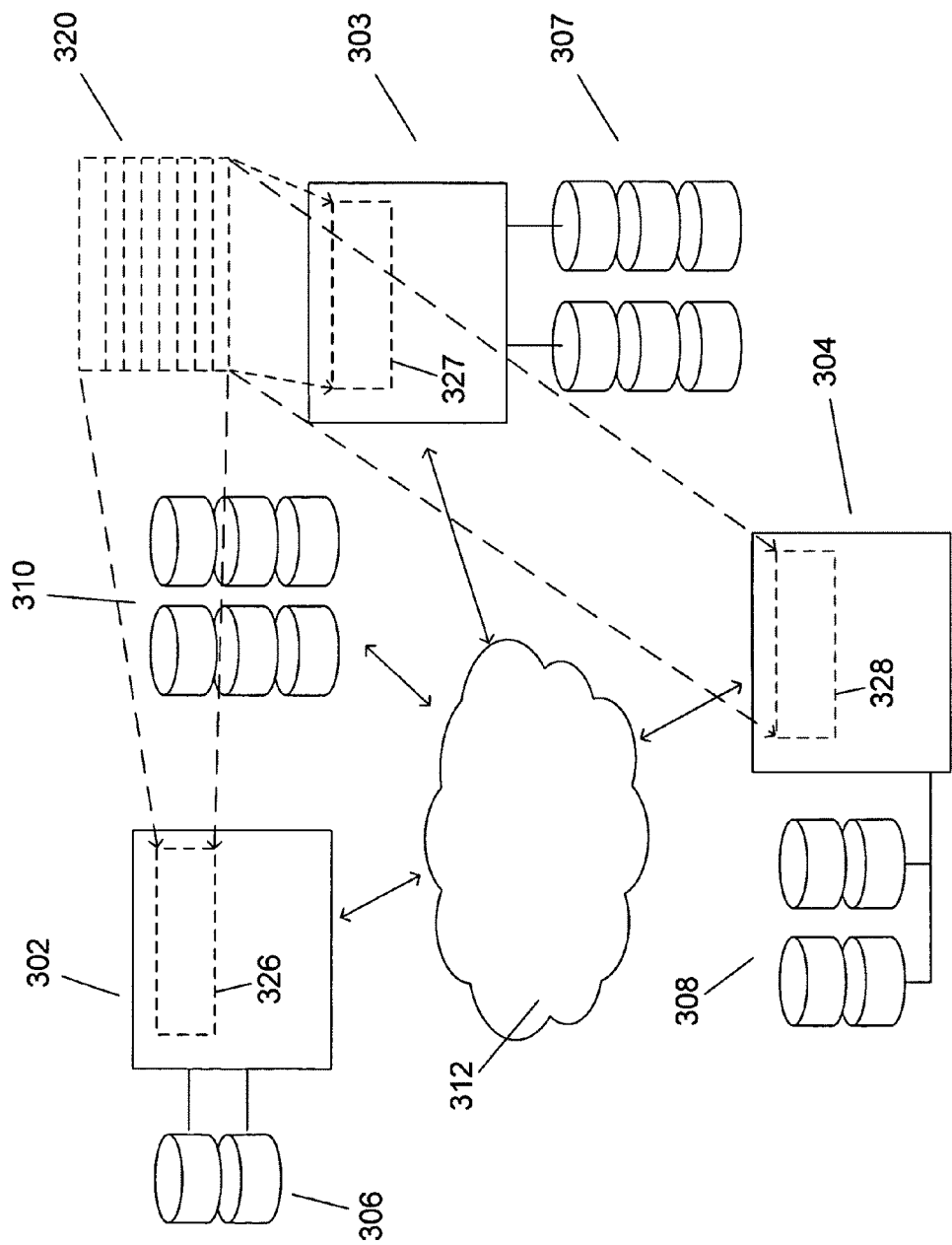
FIG. 3 illustrates a distributed database-management system.

In modern database-management systems, databases may be distributed across many different computer systems. FIG. 3 illustrates a distributed database-management system. The database-management system shown in FIG. 3 comprises three large mainframe computers 302-304, each with attached mass-storage devices 306-308, respectively, and an independent mass-storage system, such as a high-end RAID system 310, all interconnected to one or more communications media 312. Users running database applications on host computers address queries to the distributed database system via the communications media 312. In certain cases, one or a few of the computer systems of the distributed database system may receive and coordinate execution of queries, and, in other cases, any system within the distributed system may receive and coordinate execution of queries. As illustrated in FIG. 3, a particular relational-database table 320 and execution of operations applied to the database table may be distributed across two or more of the computer systems within a distributed database system. In FIG. 3, portions of the relational-database table 326-328 are stored and managed in each of the three different computer systems 302-304, respectively. The relatively straightforward logical abstraction of a relational-database table, as discussed with reference to FIGS. 1A-B and illustrated in the above create-table SQL commands, may be computationally and physically implemented by extremely sophisticated and extremely complex underlying processes operating on data stored in various components of various computer systems, generally redundantly, to allow for robust failure recovery. It is clearly well beyond the scope of the current application to describe such implementation details.

Figure 4:
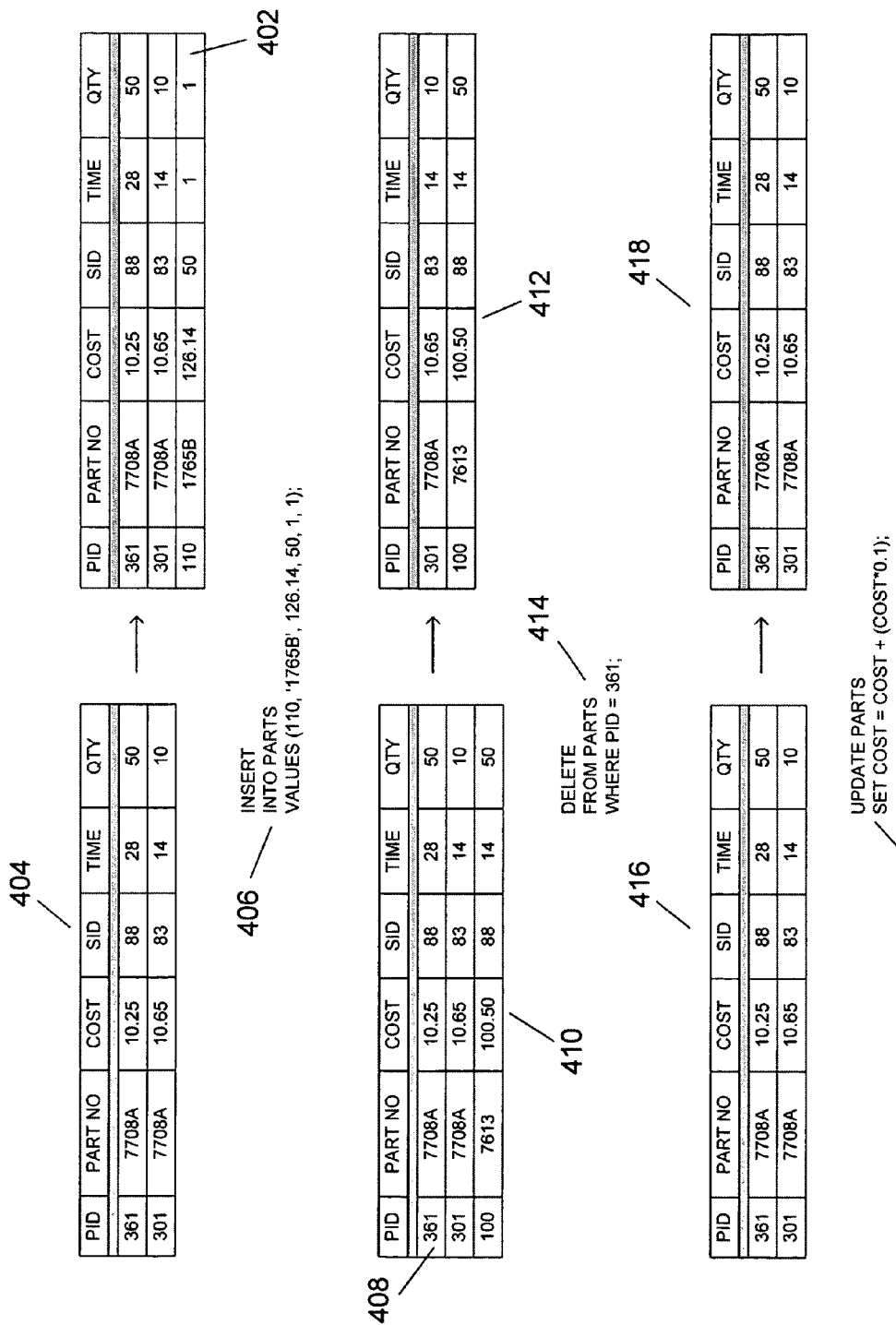
FIG. 4 illustrates different high-level commands for storing information in, and managing stored information within, relational database tables.

A relational database-management system provides a number of different high-level commands for storing information in, and managing stored information within, relational database tables. FIG. 4 illustrates certain of these commands. A new row 402 can be inserted into a two-row PARTS table 404 via the INSERT command 406 shown in FIG. 4. A row 408 can be removed from a three-row PARTS table 410 to generate a two-row PARTS table 412 via a DELETE command 414. The data contained in two rows of a two-row PARTS table 416 can be updated to produce an updated two-row PARTS table 418 using an UPDATE command 420.

Figure 5:
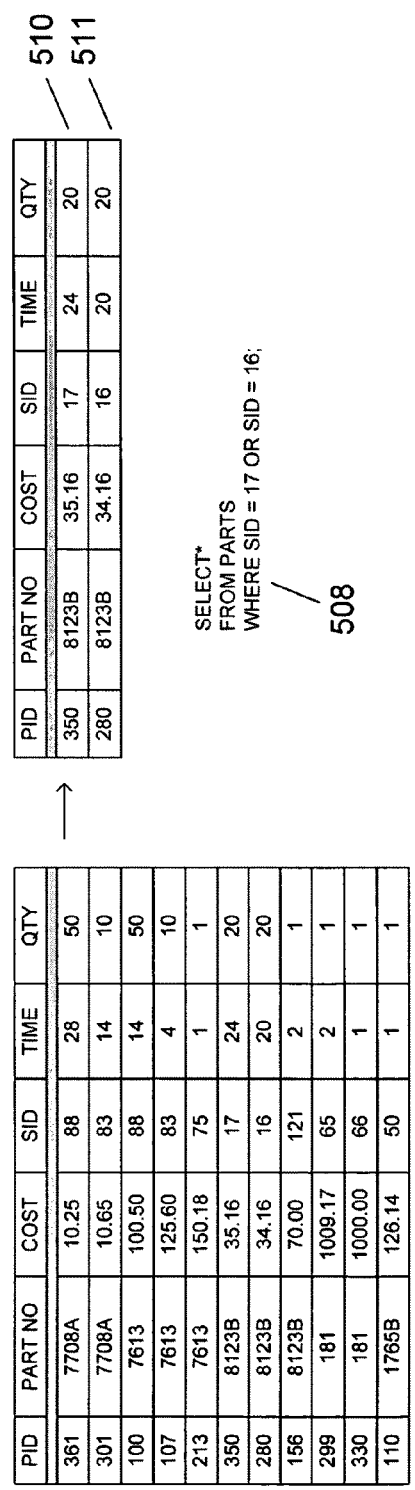
FIG. 5 illustrates relational-table-projection and relational-table-selection operations.

A relational database-management system also provides a variety of query commands that can be written together to compose a high-level database query. FIG. 5 illustrates relational-table-projection and relational-table-selection operations. A select command 502 can be used to select a subset of the columns of the relational table to generate an intermediate, logical table containing only the selected columns. In FIG. 5, the PARTS table 504 is projected to create an intermediate table 506 having only two columns. A different form of the select command 508 can be used to select a subset of the rows of a relational table that meet specified criteria to form a logical, intermediate table containing two rows 510-511 of the table PARTS 514. The row-selection criteria may be essentially arbitrarily complex.

FIG. 6 illustrates a join operation used in constructing queries. The table 602 shown in FIG. 6 is created by a join operation, embodied in query 604. The join operation essentially produces a Cartesian product of the rows of the PARTS table (102 in FIG. 1A) and the SUPPLIER table (104 in FIG. 1B) by combining the tables so that the supplier information is included along with part information in each row of the resulting intermediate table 602. As can be seen in the query 604, the combination is made, by concatenating each row in the PARTS table with a row in the SUPPLIER table having an SID-attribute value equal to the SID-attribute value of the PARTS-table row. Join operations are notorious for being potentially time and computational-resources expensive. Database-query programmers seek to minimize the number of join operations, and query-optimizer components of database-management systems seek both to minimize the number of join operations as well as to carry out joins at optimal points in a sequence of database operations.

The above-described operations correspond to high-level SQL commands. SQL commands are translated, by a query-processing component of a database-management system, into low-level database operations. In certain cases, the translation is direct, while, in other cases, multiple low-level database operations need to be executed in sequence or in parallel to carry out a high-level SQL command.

Figure 7:
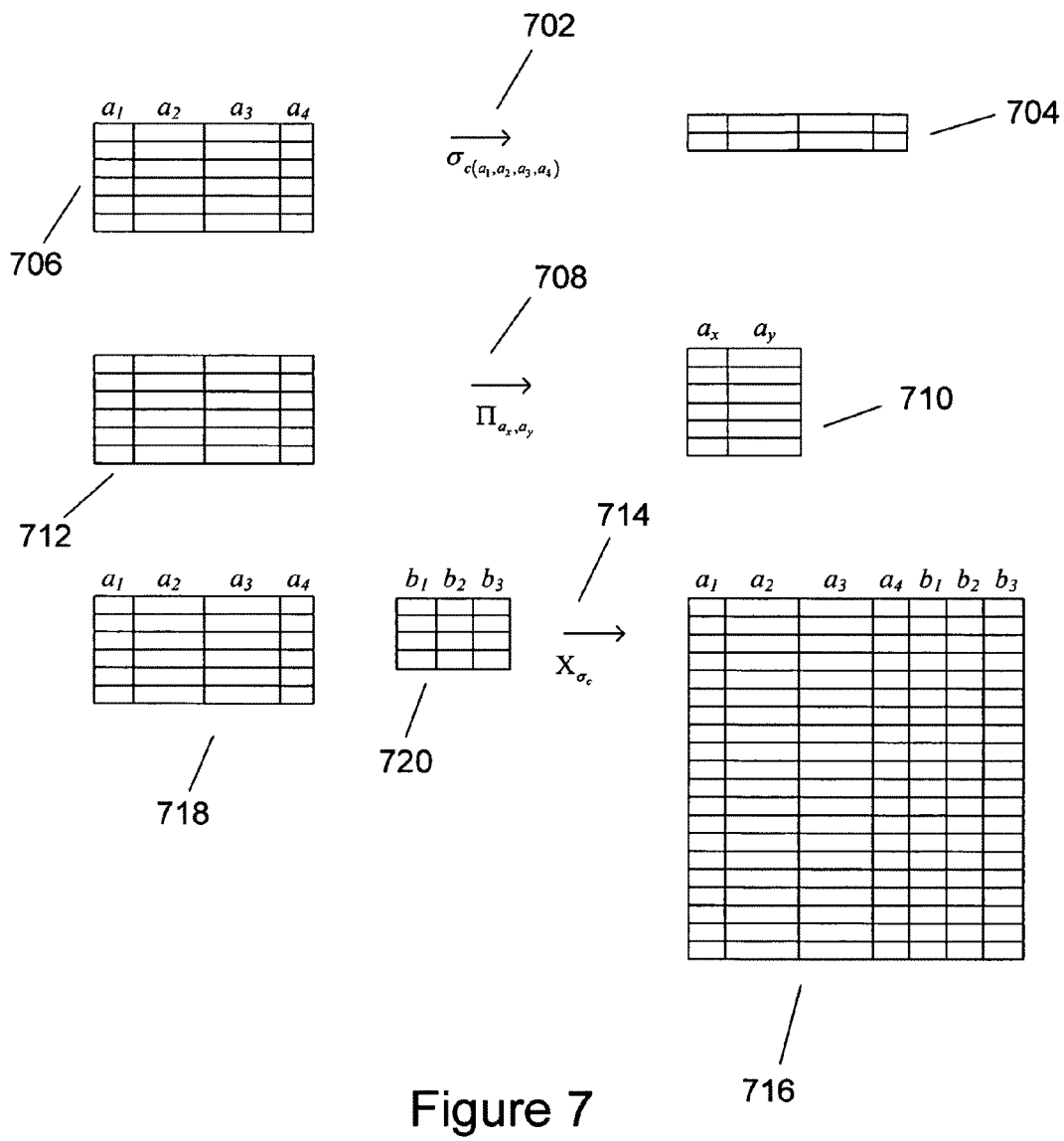
FIG. 7 illustrates three of the low-level database operations used by a database system to execute high-level queries.

FIG. 7 illustrates three of the low-level database operations used by a database system to execute high-level queries. The selection operation 702 generally selects, into a logical, intermediate table, a subset 704 of the number of rows of a table 706 based on criteria involving one or more of the attribute values within the rows. A projection operation 708 is used to create a logical, intermediate table 710 with some subset of the columns of the table 712 on which the partition operation is applied. The join operation 714 produces a Cartesian-cross-product intermediate table 716 when applied to two tables 718 and 720, generally followed by a selection operation on the Cartesian cross product based on some criteria related to the attribute values of the rows. Note that the right-hand-side tables 704, 710, and 716 in FIG. 7 are generally logical constructs, and are not necessarily instantiated in a database system separately from the tables 706, 712, 718, and 720 to which these database operations are applied. In certain cases, the logical tables are stored as temporary, intermediate tables, and, in other cases, a sequence of database operations may be combined together when executed so that no intermediate tables are produced for certain of the sequentially executed operations. There are many additional database operations used by database-management systems to execute queries, and query languages, such as SQL, offer many different commands that can be combined together to produce complex queries. It is beyond the scope of the present application to describe or even list the various commands and functionalities and underlying low-level database operations for any particular database-management system.

Figure 8:
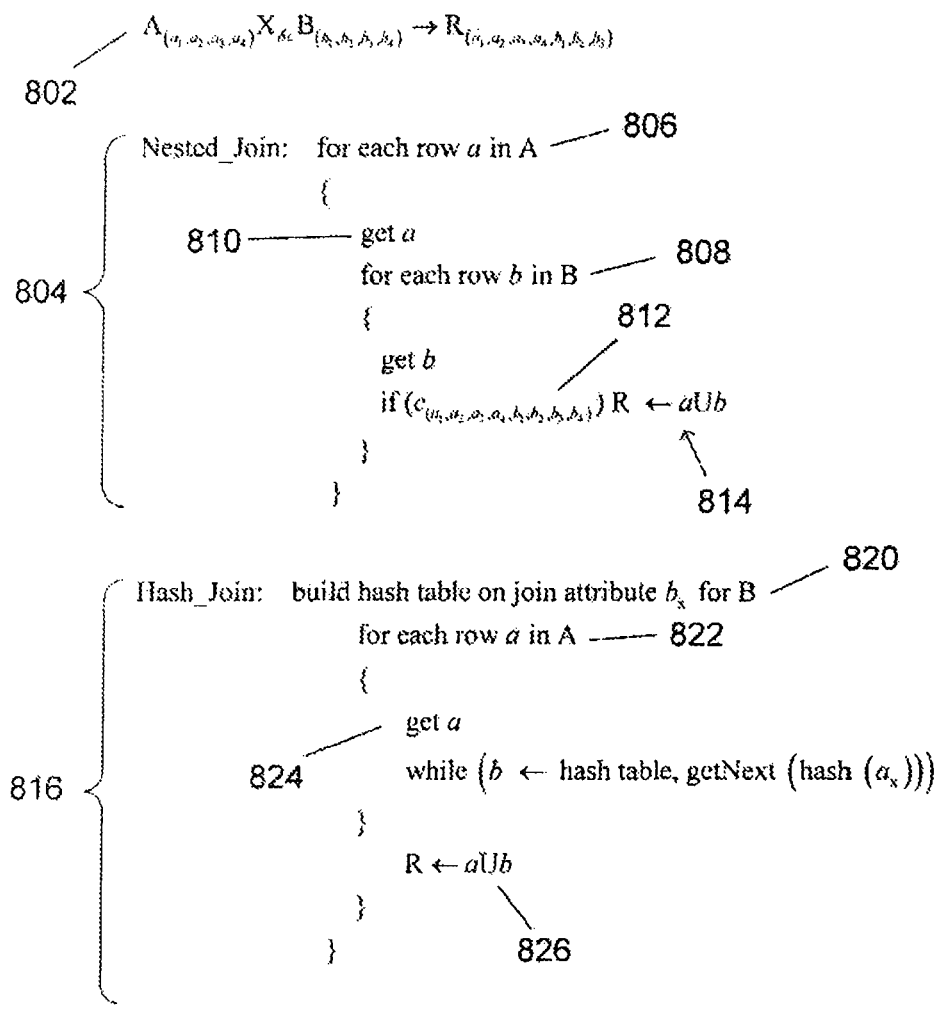
FIG. 8 illustrates two different ways that an equi-join can be carried out within a database-management system.

In many cases, there are a variety of different ways in which a database-management system can carry out a particular database operation. FIG. 8 illustrates two different ways that an equi-join can be carried out within a database-management system. An equi-join 802 produces the Cartesian cross product R of tables A and B, where each row of table A is merged with all rows of table B that have the same value for a particular attribute, referred to as the "join attribute," of the row of table A, producing a number of merged rows equal to the number of rows of table B that include a join-attribute value that matches the join-attribute value of the row of table A. Thus, an equi-join requires that the two joined tables share an attribute with a common data type, the values of which can be compared in order to decide which rows of the two tables to merge together to form merged rows of the resulting intermediate result table.

A first approach to implementing the equi-join operation is referred to as the "nested join." A description of a first implementation of the nested-join method, referred to as the "full plain nested-loop join," is shown in the pseudocode block 804 in FIG. 8. The nested join is implemented as a pair of nested for-loops 806 and 808. In the outer for-loop 806, each row a in table A is retrieved from the database 810. For each row retrieved from table A, all of the rows from table B are sequentially retrieved in the inner for-loop 808, and for each pair of rows a and b, the join criteria are evaluated 812. If join criteria are satisfied, the currently considered rows a and b are merged and entered into the result table R 814. A preferred alternative implementation of the nested-join approach to implementing the equi-join operation is referred to as the "nested join with index lookup." This alternative approach involves replacing the inner for-loop 808 in FIG. 8 with an index-based fetch of only those rows of table B that satisfy the join criteria with respect to the currently-considered row a retrieved from table A. In this alternative implementation, rather than needing to read each row of table B for every row of table A, an index operation is used to retrieve the row or rows of table B that satisfy the join criteria for each row of table A. The nested join with index lookup is clearly more efficient than the full plain nested-loop join, particularly when the index on table B has already been created. In the following, both the full plain nested-loop join and the nested join with index lookup are referred to, collectively, as the nested join.

An alternative approach to carrying out an equi-join operation is referred to as the "hash join," pseudocode for which is contained in pseudocode block 816 in FIG. 8. In a first step of the hash-join method 820, all of the rows in table B are retrieved, and a hash table is generated for the rows, with the join attribute serving as the hash value. Then, in a single for-loop 822, each row a of table A is retrieved from the database 824. For each row a retrieved from table A, each of the rows of table B obtained from the hash table using a hash of the join attribute of row a are merged with row a together and entered as a row of the result table R 826.

Figure 9:
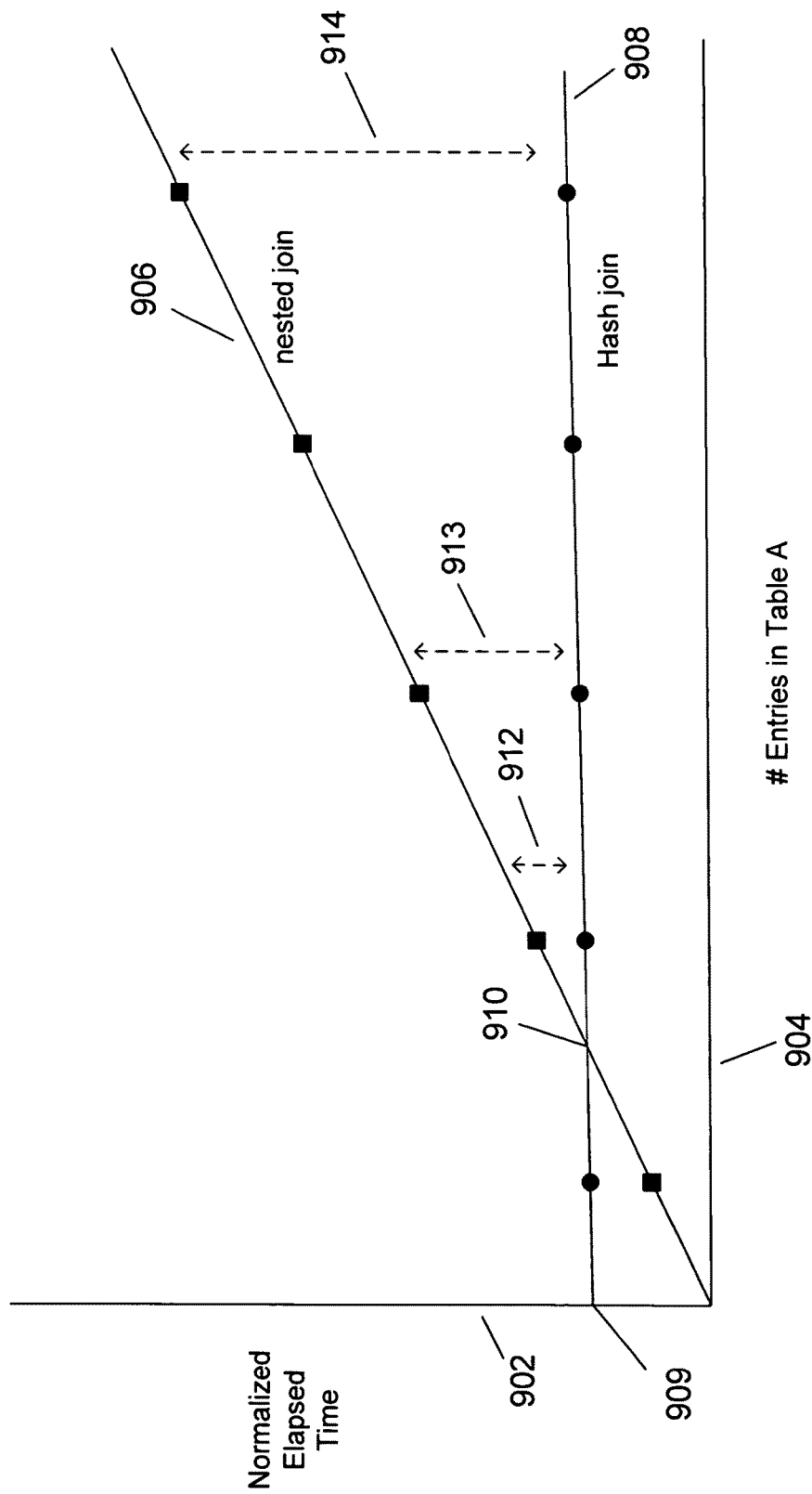
FIG. 9 shows plots of hypothetical functions that relate the time of execution of the nested join and hash join to the number of rows in a table to which a join operation is applied.

FIG. 9 shows plots of hypothetical functions that relate the time of execution of the nested join and hash join to the number of rows in a table to which a join operation is applied. In FIG. 9, the normalized elapsed time required for execution of the join is plotted with respect to the vertical axis 902, and the number of rows in table A of the nested-join and hash-join examples in FIG. 8 is plotted with respect to the horizontal axis 904. The plot 906 in the graph shown in FIG. 9 represents the time of execution of the nested join as a function of the number of rows in table A. The execution time is clearly a linear function of the number of rows in table A. The plot 908 in the graph shown in FIG. 9 represents the time required to execute the hash join as a function of the number of rows in table A. The execution time for the hash join is also clearly linearly proportional to the number of rows in table A, but the slope of plot 908 is far smaller than that of the plot of the nested join 906. Using the hash join on a very small table A incurs significant setup penalties without large subsequent benefit, as can be seen by the non-zero vertical-axis intercept 909 of plot 908. However, as the number of rows in table A increases, a crossover point 910 is relatively quickly reached where the startup penalties associated with constructing the hash table for a hash join are offset by the much faster access to matching B-table rows, and, as the number of rows in table A increases further, the differences in elapsed time between the nested join and hash join, shown at three different table-A sizes by dashed, double-headed arrows 912-914, relentless increase.

The nested-join and hash-join alternatives for carrying out an equi-join operation provide an example of a high-risk database operation. For very small table sizes, the nested join provides for a more time-efficient join-operation execution. However, the advantage of the nested join quickly diminishes as the crossover point 910 is reached. As table A sizes increase further, to the right of the crossover point, the disadvantage of using a nested join appears to increase without limit. Choosing the nested join for very small tables may provide execution efficiency, but, were table sizes incorrectly estimated, and were a nested join to be employed for a join operation applied to a very large table A, the inefficiency of the join operation compared to the hash join may well be spectacular. The table examples shown in FIGS. 1A-B are tiny relational tables by comparison to relational tables encountered in many real-world data bases. Tables may have millions to billions of rows and may have a large number of columns. When a query optimizer considers a particular join operation in order to decide whether or not to use a nested join or a hash join, and when the table operands of the join are intermediate tables produced by previously executed low-level database operations, the query optimizer may have only a very imprecise estimate for the sizes of the intermediate tables. Were the size of table A to be estimated to be 20 rows, the query optimizer may select the nested join in preference to the hash join. However, were table A to actually contain several million rows, execution of the join operation may require many minutes or hours to execute in addition to the estimated execution time based on the 20-row estimate.

In describing the present invention, very simple examples are used. There are, for example, many different possible ways of carrying out join operations in addition to the nested join and hash join. There may be many different considerations that come into play when attempting to optimize queries. Although time of execution is generally an important parameter, time of execution may be far more important in certain situations, such as online transaction processing, than in others, such as complex business-analysis systems. Furthermore, in addition to execution time, there may be other optimization criteria related to computational band width, memory size, available data-storage space in mass-storage devices, communications overheads in distributed database systems, and other such considerations. Therefore, the decision to use one particular method for executing a database operation in preference to another may require complex and even contradictory considerations.

Another example of a potentially risky database operation is a single-thread or single-process database-operation implementation that runs on a single computer, when the database operation can be alternatively implemented as a distributed, parallel operation across multiple processors and/or computer systems. Much like the hash join, a parallel approach suffers certain initial setup costs and communications overheads. However, when the numbers of rows in the tables involved in an operation are large, a parallel approach to implementing the operation may be substantially more time efficient than a single thread or single-process implementation.

Figure 10:
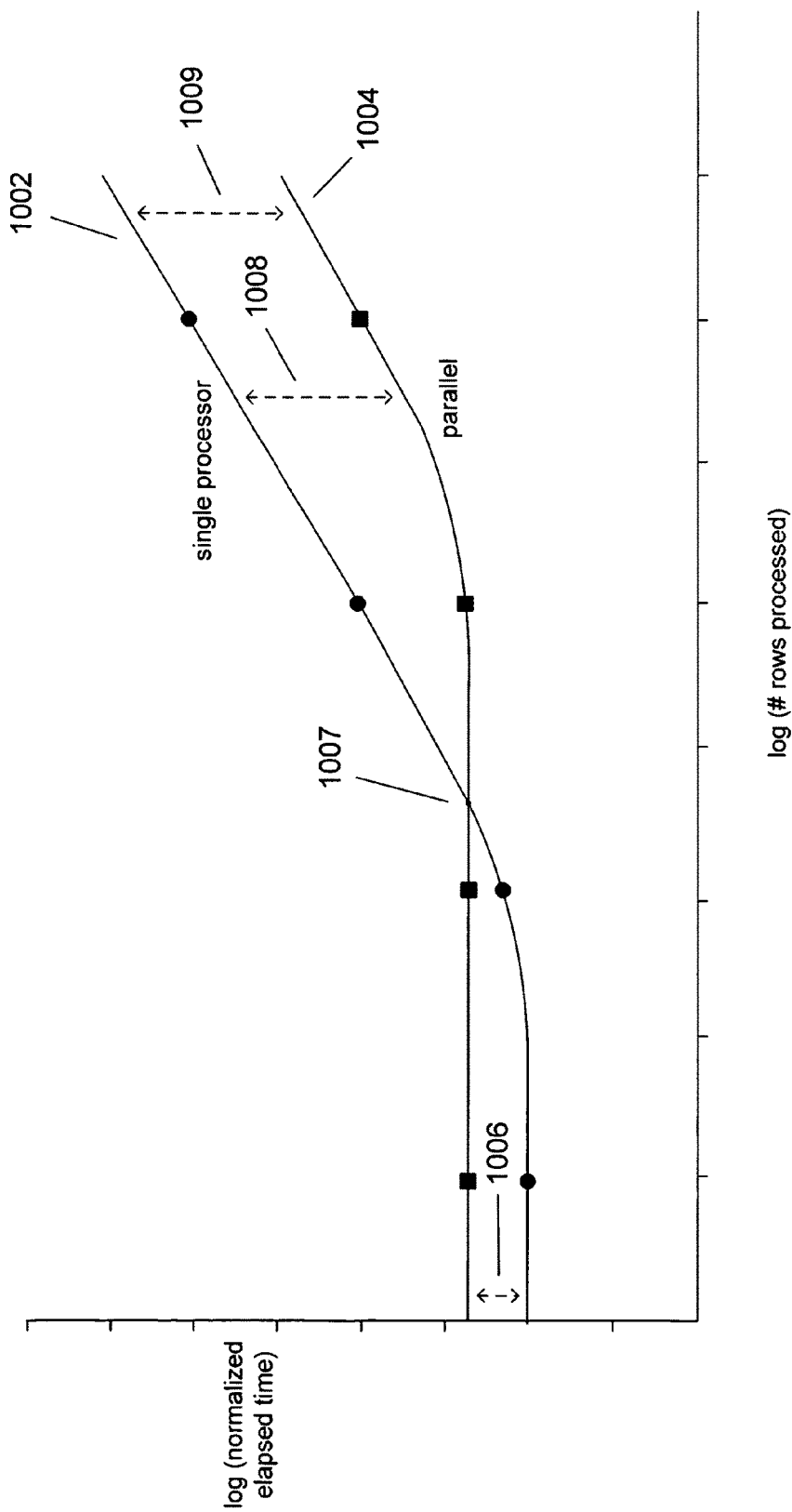
FIG. 10 illustrates functions of execution time with respect to table size for a pair of less-risky database operations.

FIG. 10 illustrates functions of execution time with respect to table size for a pair of less-risky database operations. FIG. 10 uses the same illustration conventions as used in FIG. 9, except that FIG. 10 plots the logarithms of execution time and number-of-row values on a log-log scale. Plot 1002 represents the relationship between execution time and the number of rows processed for a single-processor implementation of a database operation, and plot 1004 represents the relationship between execution time and the number of rows processed for a 128-processor implementation of the database operation. Initially, as shown by the dashed, double-headed arrow 1006, the single-processor implementation is more time efficient, because of the setup time required to launch a parallel-processing implementation. However, a crossover point 1007 is again reached, as in FIG. 9, after which the parallel-processing implementation is more efficient, as can be seen by the differences in time of execution shown by dashed, double-headed arrows 1008-1009. However, the ratio of the differences in time of execution is relatively constant, with the parallel-processing implementation providing an approximately 100-fold better time efficiency than the single-processor implementation. There remains a risk, in the case illustrated in FIG. 10, of choosing an incorrect approach for executing the database operation, either by selecting the parallel-processing implementation when the number of rows to be processed falls to the left of the crossover point or by selecting the single-processor implementation when the number of rows to be processed falls to the right of the crossover point. However, unlike the case illustrated in FIG. 9, the risk is at least bounded. Note that the log-log plot significantly shortens the axes in FIG. 10, with respect to those of FIG. 9, for a given range of table size or execution time, and thus somewhat exaggerates the differences between the two approaches.

In other cases, two or more different choices for database-operation implementation may have quite small execution-time or computational-resource differences, so that the database operation is not risky. In these cases, the penalty for an incorrect selection of a particular implementation is generally quite small, regardless of table sizes.

FIG. 11 illustrates a database query. An English-language version of the query 1102 is first provided in FIG. 11, followed by an SQL statement of the query 1104. The query-planner and query optimization components of a database-management system may translate the SQL query 1104 into various different query-execution plans that each represents the database operations, and sequence of execution of the database operations, that are carried out according to the query-execution plan to execute the SQL query. The query-planner and query optimization components of the database-management system then evaluate the query-execution plans by estimating the cost of executing the query-execution plans, selecting for execution the query-execution plan with lowest estimated cost. The cost may be the execution time, or may involve other optimization criteria, as discussed above.

Figure 12:
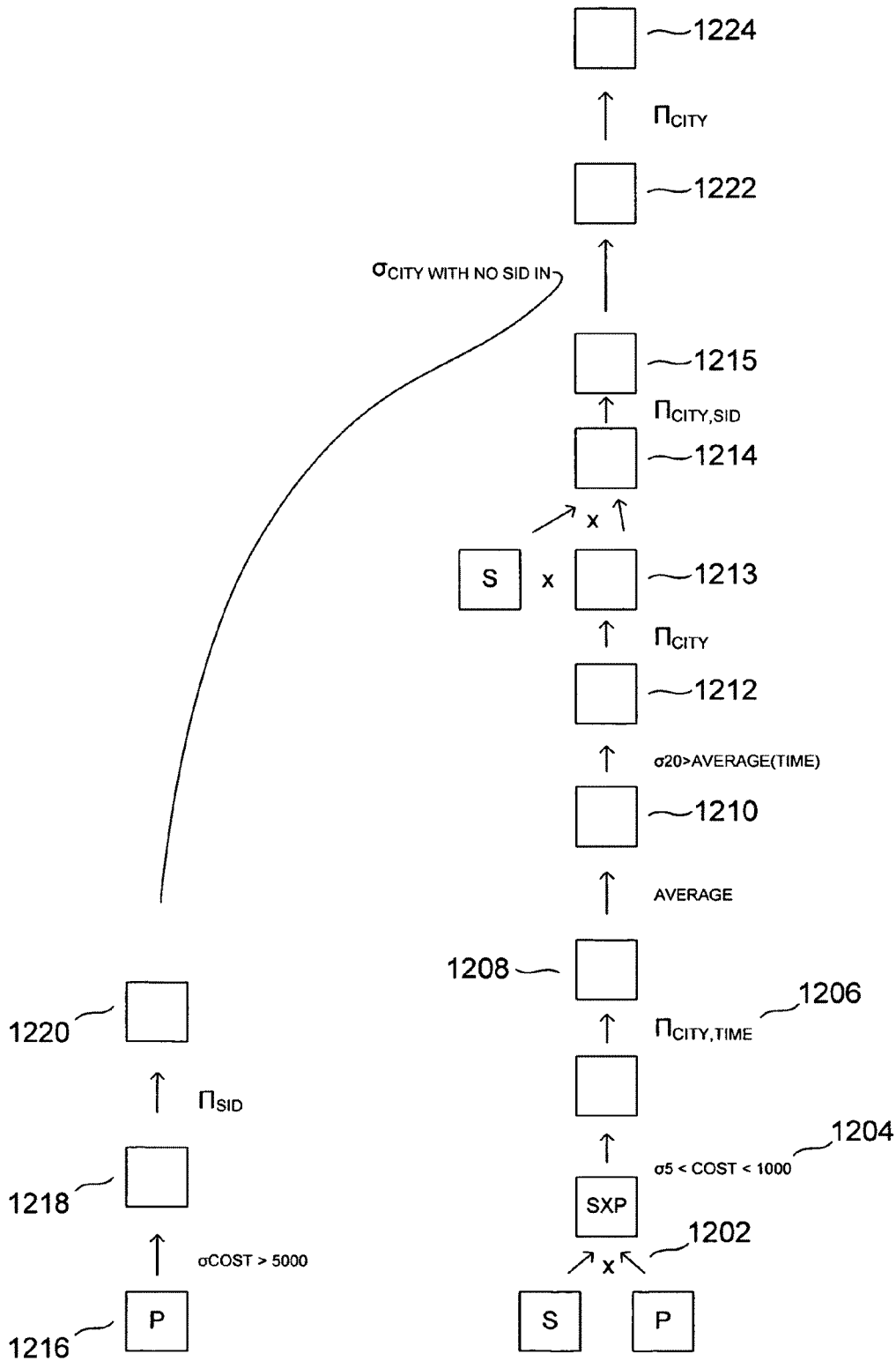
FIG. 12 illustrates a first query-execution plan for executing the database query shown in FIG. 11.

FIG. 12 illustrates a first query-execution plan for executing the database query shown in FIG. 11. This query-execution plan follows the structure of the query shown in FIG. 11. Query-execution plans are often tree-like structures of relational operators, with multiple paths and subtrees leading to a root result-generating operation. The query plan assumes the existence of various low-level database operations, some of which may themselves be implemented as a sequence of primitive database operations. FIG. 12, and FIGS. 13-15 which follow, are provided only as illustration of the form of a query tree, and are not intended to reflect actual query trees that might be produced by any given database-query optimizer. In the query-execution plan of FIG. 12, the PARTS and SUPPLIERS tables are initially joined by an equi-join operation 1202. The resulting table is then selected 1204 and projected 1206 to produce an intermediate table 1208 containing CITY and TIME columns and rows representing parts that cost greater than $5.00 and less than $1,000. An average operation then averages all of the times for each city in a selection-type operation to produce a smaller table 1210 containing one row per city, each row containing the name of the city and the average time parts are shipped from suppliers in that city. Intermediate table 1210 is then selected to remove rows with average time greater than 20 days to produce yet another intermediate table 1212. This intermediate table is selected on the single column CITY to produce intermediate table 1213, which is then joined with the SUPPLIERS table to produce intermediate table 1214. This intermediate table is then projected to include only a column for cities and a column for SIDs 1215. In a parallel path, the PARTS table 1216 is selected for parts that cost more than $5,000 to produce an intermediate table 1218. This table is projected down to a single SID column 1220. A final selection on intermediate table 1215 is carried out with selection criterion that, for each selected row, the value for the CITY attribute is not associated in intermediate table 1215 with an SID attribute that occurs in intermediate table 1220. A final result table 1224, produced by a projection on the intermediatre table 1222 produced by the final selection operation contains the cities that represent an answer to query 1102 in FIG. 11.

Figure 13:
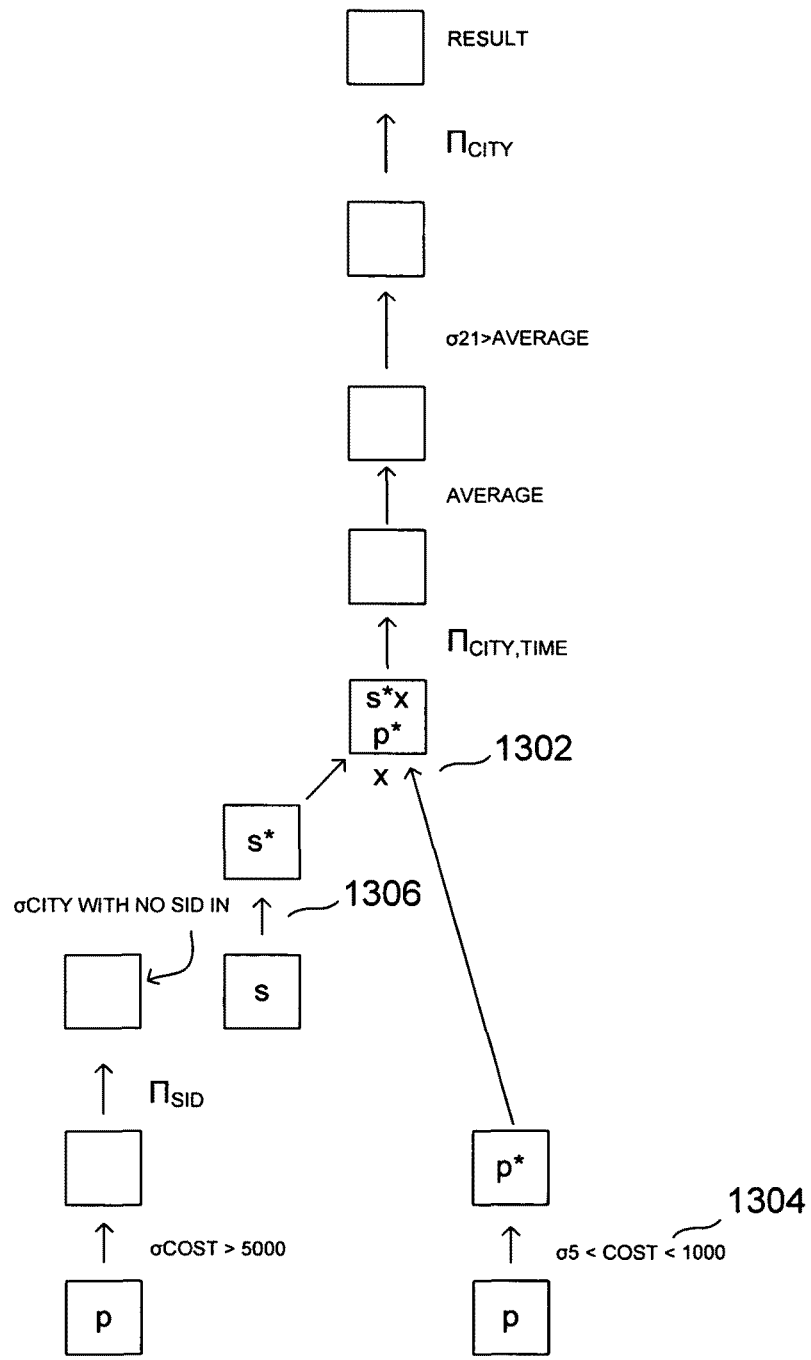
FIG. 13 shows an alternative query-execution plan for execution of the query shown in FIG. 11.

FIG. 13 shows an alternative query-execution plan for execution of the query shown in FIG. 11. In this alternative query-execution plan, the join operation 1302 is deferred until after selection operations 1304 and 1306 on the SUPPLIERS table and PARTS table. By doing so, the join operation is carried out on significantly smaller tables, and is therefore more execution-time efficient. Furthermore, there are fewer steps in this second query-execution plan.

Neither query-execution plan shown in FIGS. 12 and 13 is optimal. These hypothetical query-execution plans are meant only to illustrate the concept of query-execution planning and query-execution-plan optimization, and are not intended to illustrate an optimal query-execution plan for the above-discussed SQL query.

The query-planning component of a database system may attempt to produce some number of potentially most efficient query-execution plans, which are then evaluated in order to choose the most optimal query-execution plan. Query-execution planning and query optimization may be carried out largely concurrently, by a single query-planning and query-optimizing database component, in which optimization is carried out during query-execution-plan construction. Alternatively, a query-execution planner may generate numerous alternative query-execution plans, from which the query-execution plan estimated to be most efficient is selected for executing a query. Hybrid approaches, in which optimization occurs both during query-execution-plan construction as well as in selecting a best query-execution plan from query-execution-plan alternatives are often employed. Embodiments of the present invention are relevant to all approaches.

Figure 14:
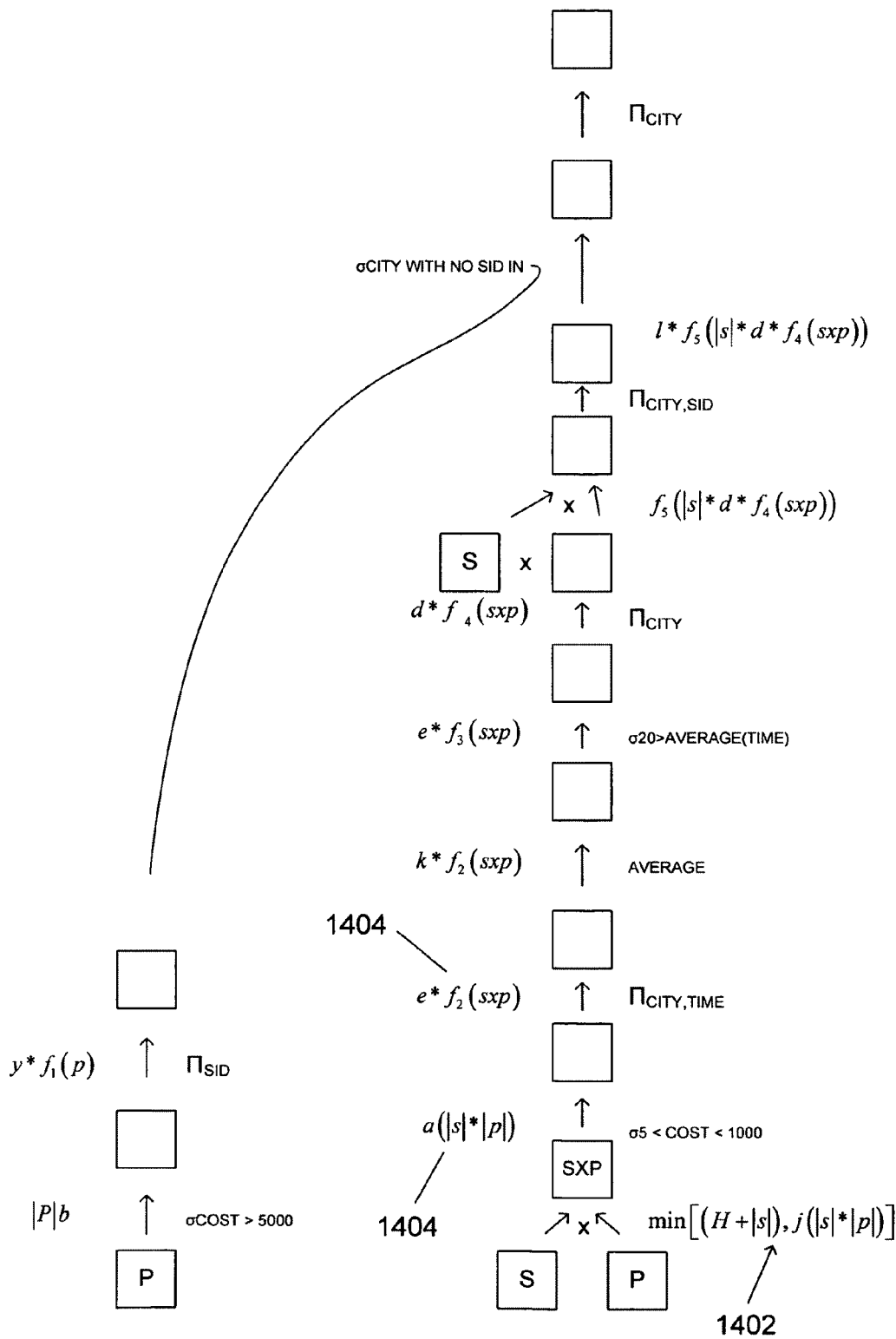
FIGS. 14 and 15 illustrate evaluation of a query-execution plan by a query optimizer.
Figure 15:
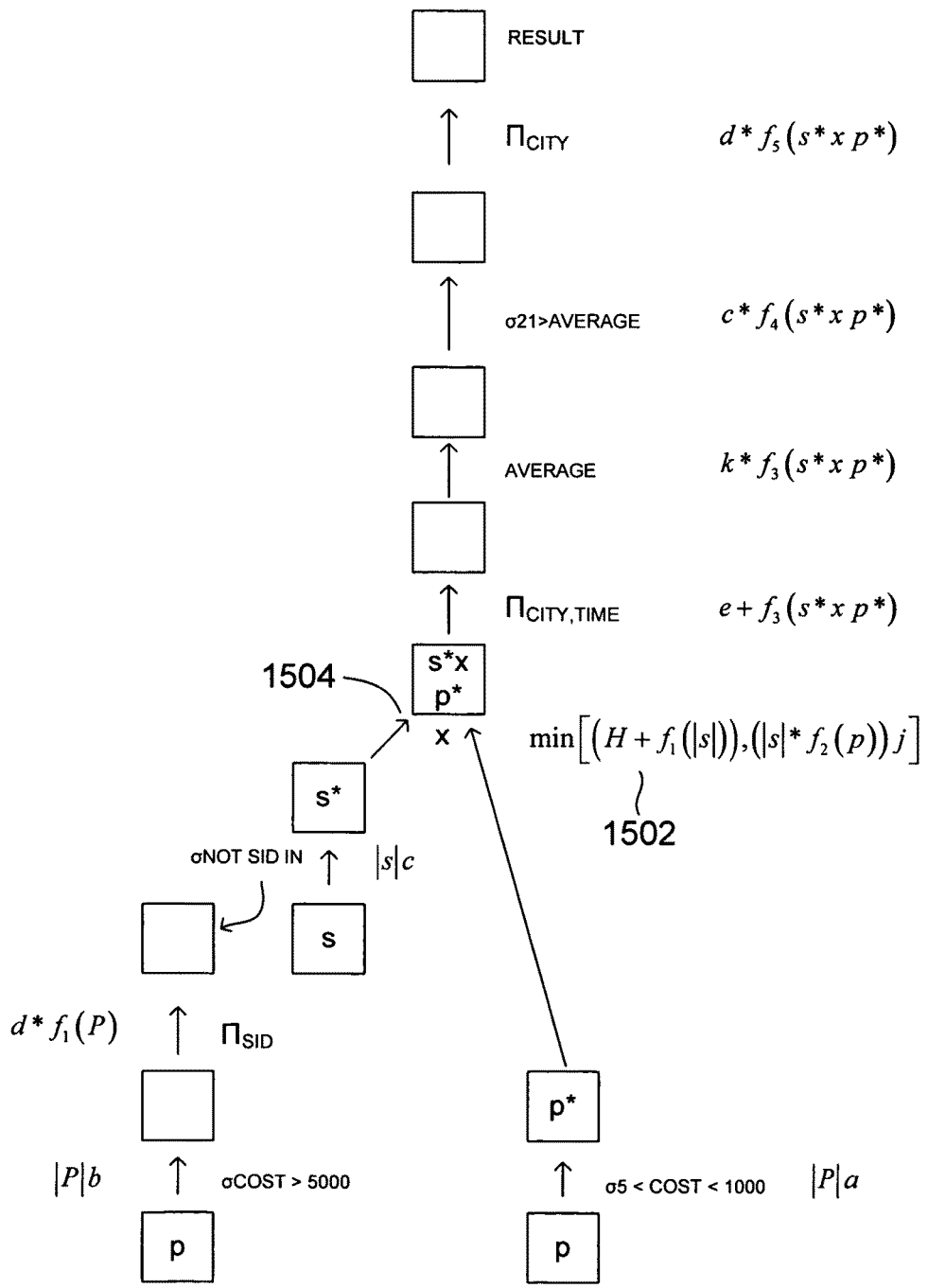

FIGS. 14 and 15 illustrate evaluation of a query-execution plan by a query optimizer. The query optimizer assigns an estimated cost to each operation, and sums all of the estimated costs together to produce a final estimated cost for executing the query-execution plan. In many cases, the cost for a particular operation is related to the cardinality, or the number of rows in, the table or tables to which the operation is applied. The cardinality for underlying, initial physical tables may be well known, but at each step up through a query path, the cardinalities of intermediate tables may become less and less reliably estimable. For example, in FIG. 14, the cost for the join operation 1402 takes into account the actual cardinalities of the SUPPLIERS and PARTS tables. Cost is shown as a minimum of the cost of a hash join and a nested join, indicating that the query-execution planner and/or query optimizer needs to choose whether to use a nested join or hash join for this join operation. Whichever join is estimated to have lower costs, based on the cardinalities of the SUPPLIERS and PARTS table, is selected. Similarly, the cost of the next selection operation 1404 can be estimated based on the cardinality of the join of the PARTS and SUPPLIER tables. However, for all of the subsequent operations in this branch of the query-execution plan, the query optimizer can only estimate the costs. The selection 1404 selects only those roles of the join table in which the cost is greater than 5 but less than 1,000. In general, the query optimizer can only estimate the number of rows meeting this criteria based on certain statistics kept for the table. Therefore, the cost 1406 for this operation is based on some estimation function $f_2$ rather than directly on the cardinalities of the table being selected. As the number of operations preceding an operation in a query-execution-plan branch increases, the reliability of cardinality estimates correspondingly decreases, since estimation errors tend to be compounded. In FIG. 15, the estimated costs for the join operation 1502 can only be estimated, rather than based directly on the cardinalities of the underlying tables. Note also that the total cost, at any point in a query-execution-plan branch, includes the cost of a currently considered operation added to the sum of the costs of all preceding operations.

As discussed above, the nested-join operation is a high-risk operation. Thus, the join operation 1504 in the query-execution plan shown in FIG. 15 represents a critical evaluation step for the query optimizer. In current query optimizers, the decision is made based on the estimates for the sizes of the underlying, intermediate table S* and P*. Thus, when the estimated size of P* is quite small, the query optimizer employs the minimization expression 1502 to choose the nested join, but when the size of the intermediate table P* is estimated to be bigger than a threshold size, the hash join is chosen. However, as discussed above, if the estimate for the cardinality of the intermediate table P* is unreliable or incorrect, there is a significant risk that choosing the nested join may exponentially increase the time for query execution, as well as violate any of other optimization criteria that the query optimizer may be considering.

Figure 16:
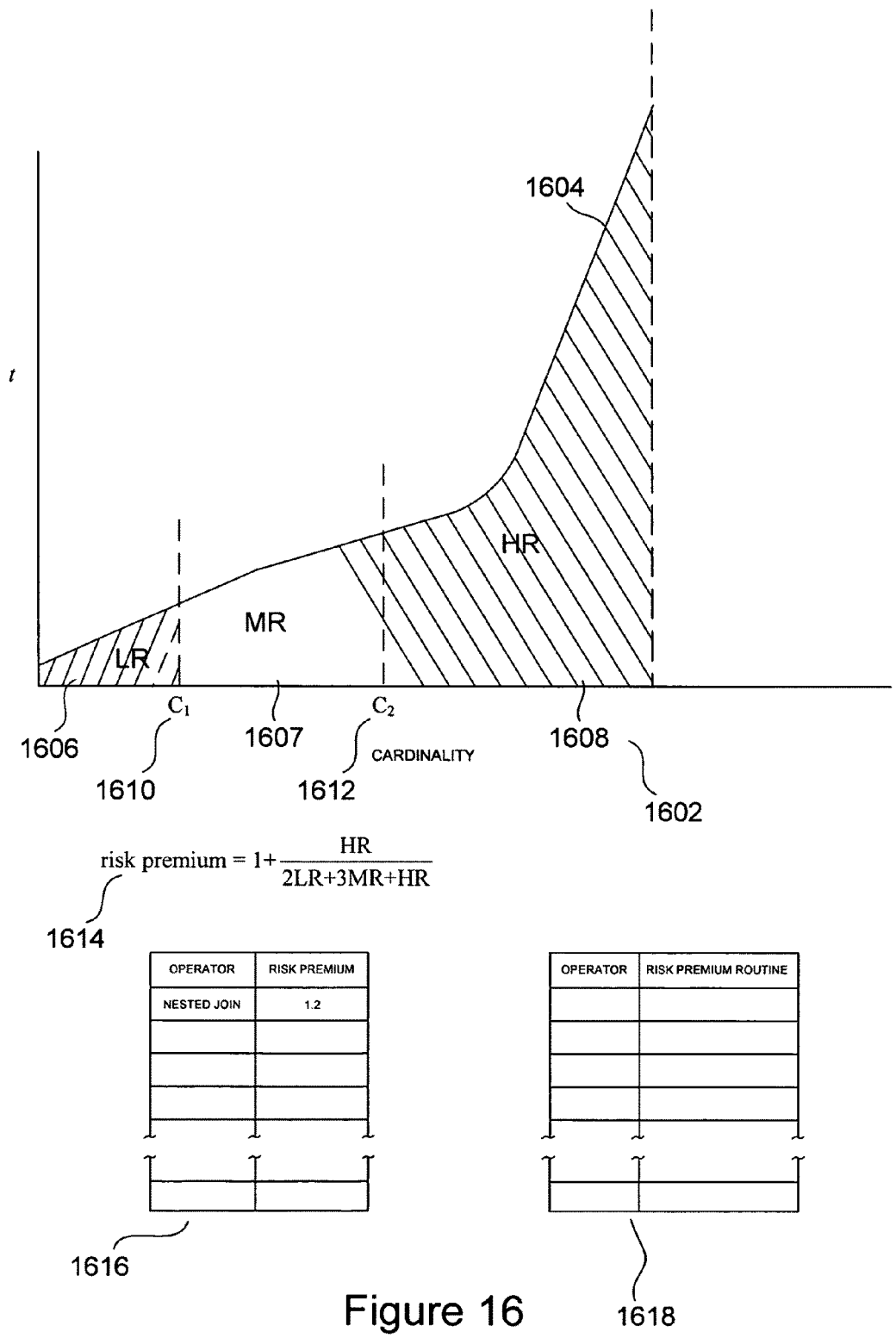
FIG. 16 illustrates computation and storage of risk-premium values for database operations according to one embodiment of the present invention.

FIG. 16 illustrates computation and storage of risk-premium values for database operations according to one embodiment of the present invention. At the top of FIG. 16, the graph of a time versus cardinality function for a risky operation 1602 is shown. The area underneath the curve is divided into three sections 1606-1608 by two cardinality values $C_1$ 1610 and $C_2$ 1612. An exemplary risk-premium calculation for the operation is shown in equation 1614. The riskiness of the operation is related to the area on the right-hand portion of the graph divided by the total area under the curve. There are many different possible ways for calculating a risk premium for an operation. The exemplary calculation shown in FIG. 16 is intended to provide an example of one such calculation. A risk-premium calculation may be based on statistics calculated for operation execution under various different conditions, with reasonably sophisticated statistical analysis to provide a single figure that well represents, in general, an operation's riskiness. The risk premium associated with each database operation may be stored in a table, such as table 1616, for use in query-optimizer valuations, discussed below. Alternatively, a table may store calling points for routines to compute the risk premium of an operation in a particular context in which that risk premium contributes to an overall query-execution-plan or database-operation cost evaluation, such as table 1618. For example, the routine may, on the fly, numerically estimate the ratio of the area under the cost vs. cardinality curve to the right of an estimated cardinality to the total area under the curve in order to assess the risk premium to assign to an operation operating on a table of that estimated cardinality.

Figure 17:
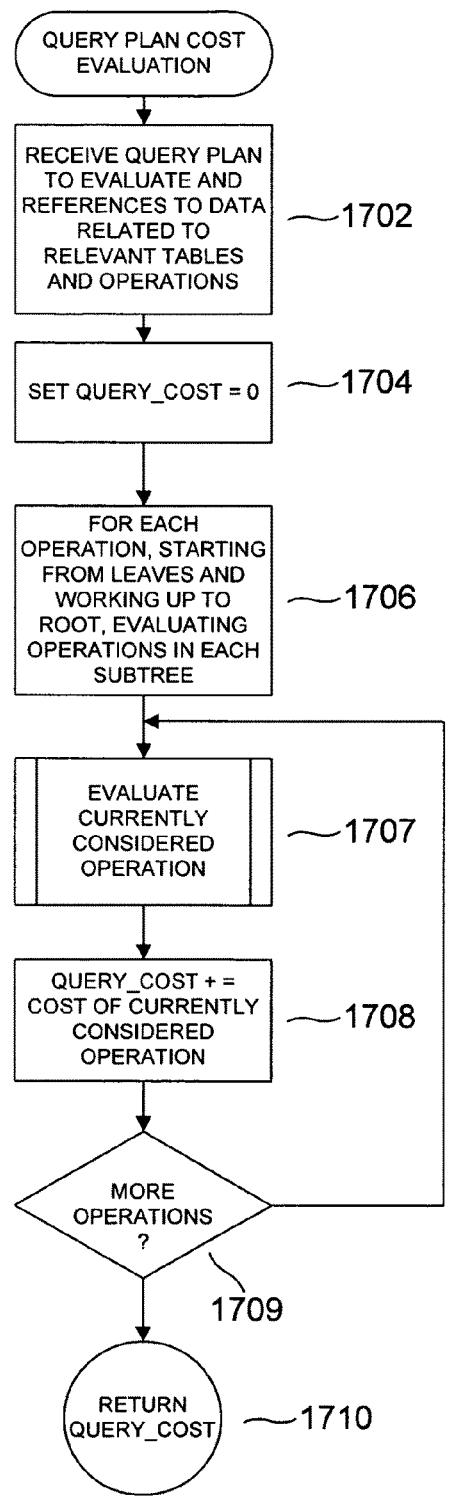
FIG. 17 provides a control-flow diagram for a query-execution-plan-cost evaluation routine.

FIG. 17 provides a control-flow diagram for a query-execution-plan-cost evaluation routine. As discussed above, a query optimizer may employ incremental query-execution-plan optimization at various steps in constructing a single query-execution-plan tree, may alternatively produce a number of alternative query-execution-plan trees and evaluate each of the trees in order to select a best query-execution plan, or may employ a hybrid approach. Query optimizers generally use a hybrid approach, to avoid creating and needing to evaluate a forest of suboptimal query-execution-plan trees. Ultimately, whether a single-query-execution-plan-construction method, a combinatoric multi-query-execution-plan-based method, or a hybrid method is employed, the method can be logically described as constructing a large number of candidate query-execution plans and evaluating those plans in order to select the best query-execution plan. The query-execution-plan-cost evaluation routine illustrated in FIG. 17 is shown as using the latter approach, although the cost evaluation of a currently considered operation, employed in this approach, is the same cost evaluation that may be employed to evaluate the cost of each node or operation when attempting to construct a single, near-optimal query-execution plan.

In step 1702, the query-execution-plan-cost evaluation routine receives a query-execution plan to evaluate as well as references to cardinality data and statistical data related to relevant tables and operations within the query-execution plan that are used to evaluate the cost of executing the query-execution plan. In step 1704, a local variable query_cost is set to zero. Then, in the for-loop of steps 1706-1709, the query-execution-plan-cost-evaluation routine traverses the query-execution plan, from leaf nodes upward to the root node, at each point evaluating cost of each operation. The total cost of the query-execution plan is, in this embodiment of the present invention, the sum of all costs computed for database operations within the query-execution plan. In alternative embodiments of the present invention, different and/or more complex cost-estimate combination techniques may used to compute the total cost of a query plan from the estimated costs of the operations. The computed operation costs are not independent from one another. Each cardinality estimate above the lowest node levels includes estimates made at lower levels, and errors in cardinality estimates thus are compounded upward through the query-execution plan. At each point in the tree, the routine "evaluate currently considered operation" is invoked, in step 1707, to evaluate the cost of the operation that represents a currently considered node in the query-execution plan within the for-loop of steps 1706-1709. Once the query-execution-plan tree has been fully traversed, the total cost of executing the query-execution plan is returned in step 1710.

Figure 18:
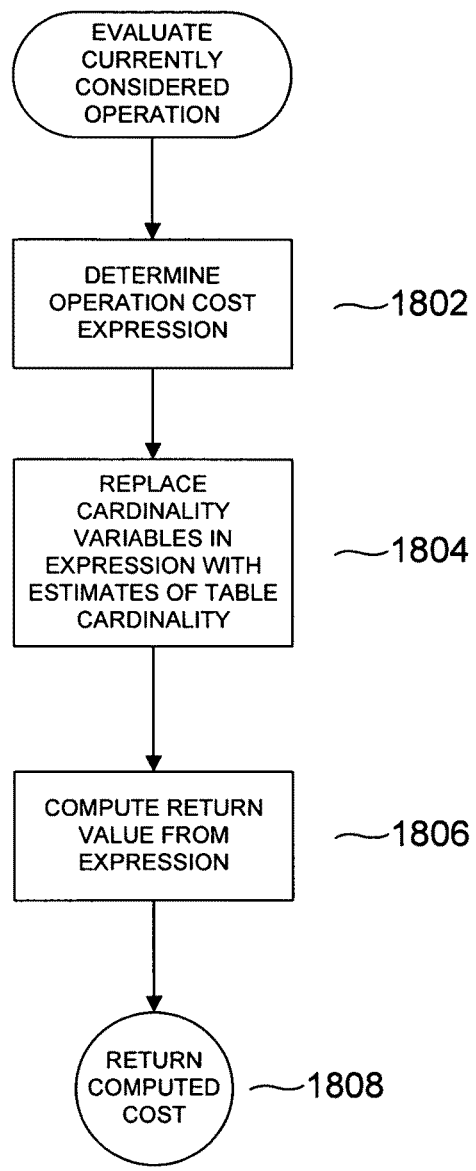
FIG. 18 provides a control-flow diagram for the routine "evaluate currently considered operation" called in step 1707 of FIG. 17.

FIG. 18 provides a control-flow diagram for the routine "evaluate currently considered operation" called in step 1707 of FIG. 17. In step 1802, an operation-cost expression is obtained for the currently considered operation. In general, an operation-cost expression is an algebraic expression with variables, or placeholders, for particular cardinalities and/or other statistics of the tables on which the operation is to be performed. In step 1804, the cardinality variables and other statistical variables in the operation-cost expression are replaced with estimates of the cardinalities of the tables on which the operation is to be applied, and other variables are replaced with corresponding statistical information related to the tables. Then, in step 1806, the fully substituted operation-cost expression is arithmetically evaluated to return a computed estimated cost for executing the operation, in step 1808.

Figure 19:
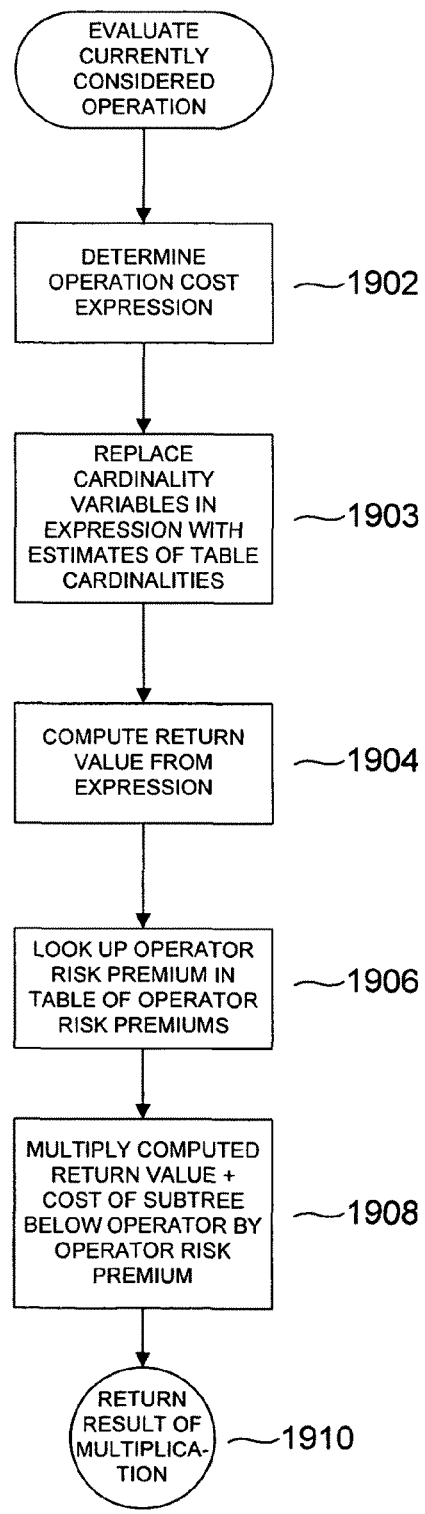
FIG. 19 provides a flow-control diagram for the "evaluate currently considered operation" routine, called in step 1707 of FIG. 17, implemented according to one embodiment of the present invention.

FIG. 19 provides a flow-control diagram for the "evaluate currently considered operation" routine, called in step 1707 of FIG. 17, implemented according to one embodiment of the present invention. The first three steps 1902-1904 in the modified routine are identical to the first three steps shown in FIG. 18. However, after the cost is computed from the fully substituted expression in step 1904, the modified routine looks up, in step 1906, the operation risk premium from a table of operation risk premiums, such as table 1616 in FIG. 16. Alternatively, the routine or function, associated with the operation, for computing the risk premium for the operation in the context of the currently evaluated operation may be retrieved from a table, such as table 1618 in FIG. 16, and the routine then called in order to compute the risk premium for the operation. In step 1908, the cost computed in step 1904 is added to the cost of the subtree for which the currently-considered operation is the root node in order to compute a total estimated cost for the query branch below and including the currently-considered operation, and that total estimated cost for the query branch is multiplied by the risk premium for the currently considered operation in order to compute a total cost for the operation, including the risk premium for the operation, in step 1910. In other words, the risk premium is applied not only to the local cost of the currently-considered operation, but to the entire cost of the currently considered operation and all operations preceding it in the query-execution plan. Thus, the risk premium is applied to a cumulative result, rather than to a single database operation, other than in the case that the currently considered operation is a leaf node of the query-execution plan, in which case the risk premium is applied only to the currently considered operation.

In alternative approaches, rather than employing risk-premium-modified estimates of operation costs to compute the estimated cost of a query plan, the risk premiums for risky database operations are employed solely to choose which of various possible operations to use in a-next node of a query tree. In other words, the risk-premium factors are not incorporated into the cost estimate, but used only for query-tree construction.

Although query-execution-plan evaluation has been described as an iterative process, query-execution-plan evaluation and query-execution-plan construction may be implemented as recursive processes, since query-execution plans are generally tree-like structures that are naturally created and traversed recursively. Similar considerations apply in either iterative or recursive implementations, although the evaluation step of the cost of an operation, step 1707 of FIG. 17, may be recursive, in nature, and may naturally compute the entire cost of the subtree for which the database operation is a root node, rather than requiring the nodes of the subtree to be traversed, and the costs of lower nodes added together, as in step 1908 of FIG. 19. In either case, the risk premium is applied to the total estimated cost of a query-execution-plan subtree, rather than to the estimated costs of individual database operations.

Figure 21:
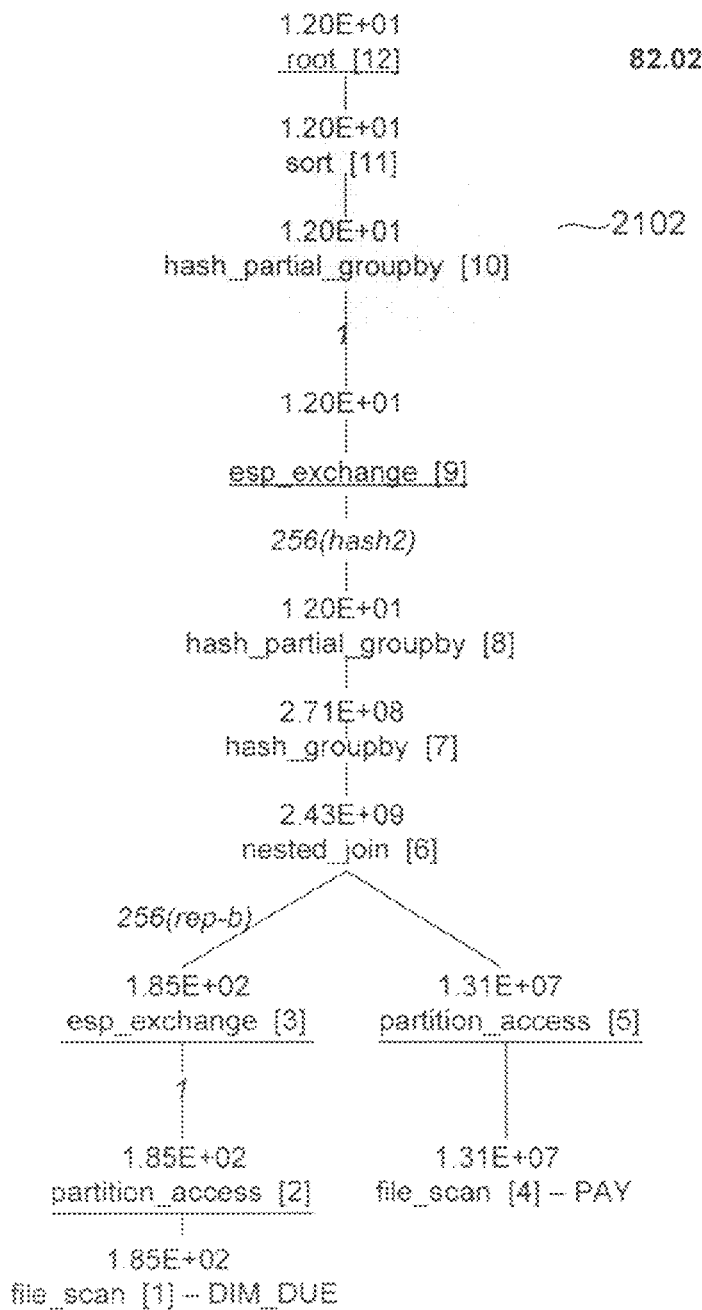
Figure 22:
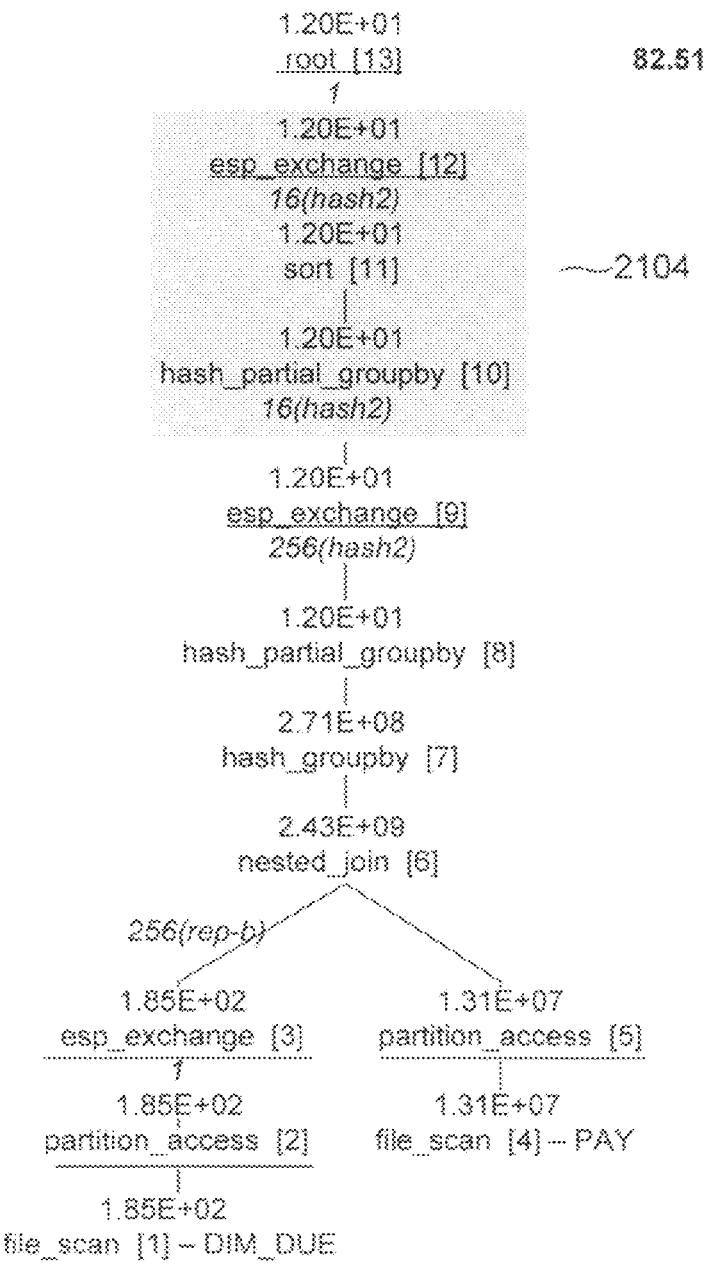

FIGS. 20-22 provide a real-world example of the pitfalls of current query-execution-plan evaluation. In FIG. 20, an SQL query 2002 is shown. This query is applied to a table PAY, relevant columns of which are described in table form 2004 in FIG. 20, and a table DIM_DUE, relevant columns of which are also shown in table form 2006 in FIG. 20. The cardinality of the two tables is illustrated in table 2008, also shown in FIG. 20. FIGS. 21 and 22 show two alternative query-execution plans for executing this query. Relevant portions of the query-execution plans are shown in shaded blocks in FIGS. 21 and 22. The query-execution plan in FIG. 21 uses a final single-process group-by operation 2102 to produce the results, since the cardinality of the intermediate table in which the group-by operation is to be executed has been estimated as containing 12 rows. By contrast, the query-execution plan shown in FIG. 22 uses a parallel group-by operation 2104. The total cost of the query-execution plan shown in FIG. 21 is 82.02 seconds, while the total cost of the query-execution plan shown in FIG. 22 is 82.51 seconds. The second query-execution plan has higher cost due to the set-up time and communications overheads associated with launching parallel processes. In this case, current query optimizers would select the query-execution plan shown in FIG. 21. However, consider the cardinality of the PAY table shown in table 2008 in FIG. 20. The PAY table is enormous. Even slight imprecision in the estimation of the size of the intermediate table, derived from the PAY table, to which the group-by operation is applied, may produce an execution time wildly different from the estimated execution time based on a 12-row intermediate table. It is possible that the intermediate table, estimated to have a cardinality of 12, might instead have a cardinality of thousands or millions of rows. In this case, the penalty associated with using a serial group-by operation in the query-execution plan shown in FIG. 21 rather than using the parallel group-by operation 2104 in FIG. 22 may be quite large. The total difference in the estimated costs for the two query-execution plans is 0.49 seconds. Query-execution times that differ markedly from estimated query-execution times are intolerable in many computing environments, such as in online-transaction-processing environments. Selecting the query-execution plan shown in FIG. 21 over the query-execution plan shown in FIG. 22 violates basic common sense. It makes little sense to choose a potentially extremely risky serial operation, in the query-execution plan shown in FIG. 21, to save less than one-half second in estimated execution time, when, if the estimates are incorrect, the query-execution plan illustrated in FIG. 21 may potentially run for many additional minutes or hours. Embodiments of the present invention are intended, in part, to ameliorate this type of common-sense violation in query-execution-plan selection undertaken by currently-available query optimizers.

Figure 23:
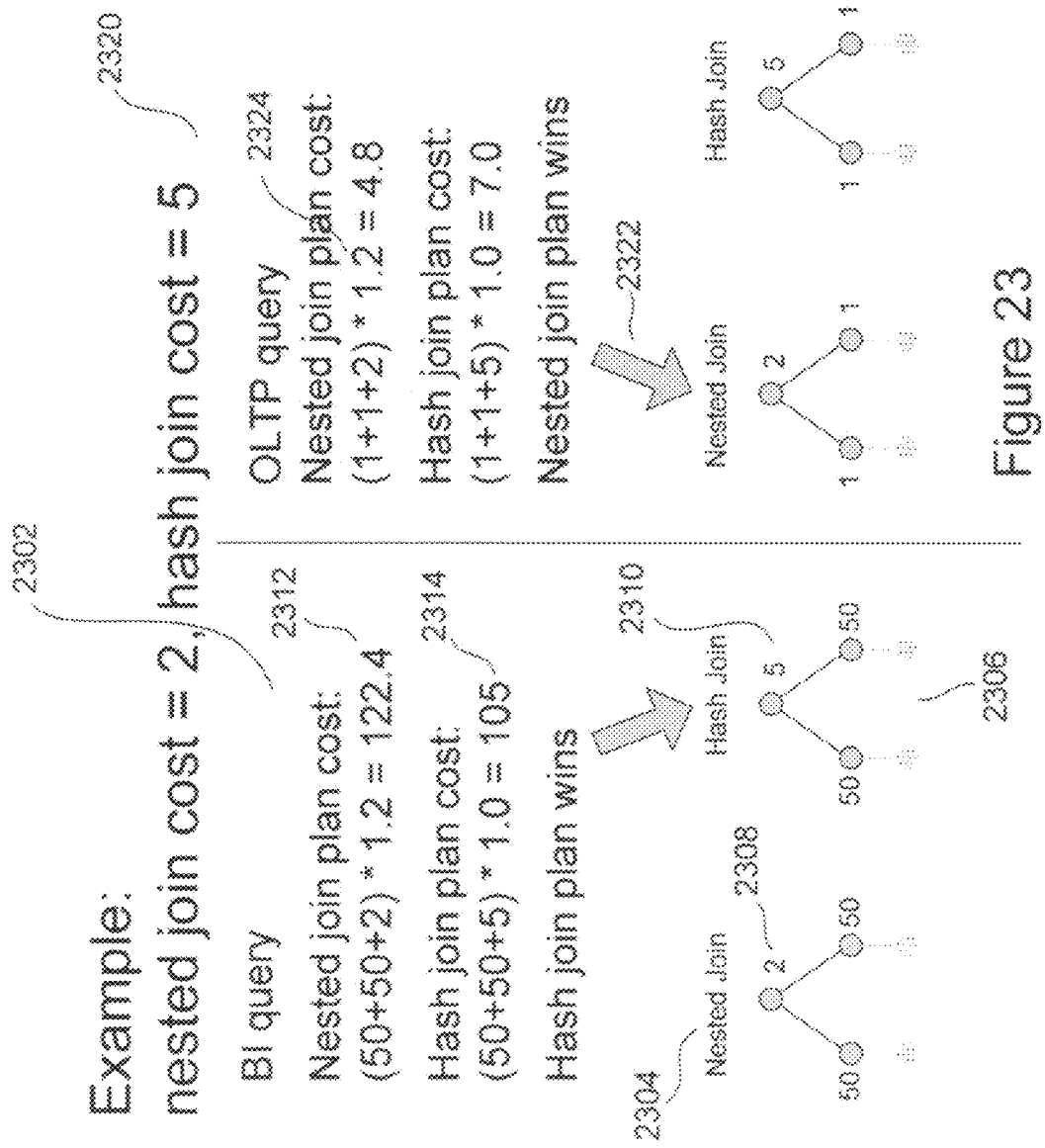
FIG. 23 illustrates a real-world example of the benefits of using risk-premium-based query optimization according to embodiments of the present invention.

FIG. 23 illustrates a real-world example of the benefits of using risk-premium-based query optimization according to embodiments of the present invention. In FIG. 23, two different query-execution-plan subtrees are being evaluated in two different computational environments. The first environment 2302 is a business-analysis environment in which underlying tables are large, and in which estimated query-execution times are generally correspondingly large. A decision needs to be made whether to use a nested join 2304 or a hash join 2306 in a root of the query-execution-plan subtree. The costs of the two subtrees below the join are, in both cases, 50. The cost of the nested join 2308 is estimated to be 2, and the cost of the hash join 2310 is estimated to be 5. However, as discussed above, the nested join is a particularly risky operation. Thus, according to the present invention, a nested-join risk premium of 1.2 is applied to the total estimated cost of the entire query subtree, including the currently-considered join operation, 102, in order to produce the total estimated cost 2312 of 122.4, which takes into account the riskiness of the nested join. A hash join has no associated risk premium, or, in other words, the risk premium for the hash join is 1.0, and so the total estimated cost 2314 for a query subtree rooted by the hash join operation, including consideration of the riskiness of the hash-join operation, is 105. In this case, according to the present invention, the hash join is selected, even though, by traditional estimation procedures, the subtree rooted by the hash join operation would have a larger estimated cost, 105, than the estimated cost of the subtree at which the nested join is root, 102, were the risk premium not applied according to the present invention. By contrast, in an OLTP environment 2320, where the underlying subtrees have low costs, due to low cardinality of underlying tables, the nested join is chosen 2322 even after applying the risk premium 2324. In the OLTP environment, even considering the riskiness of the nested-join operation, the nested join is selected, since the downside of poor cardinality estimates would not result in a large execution-time penalty.

It is important to note that the risk premium does not simply constitute estimating the cost of a risky operation as the worst-possible-case cost of applying the risky operation in a particular context, or as some fraction of that worst-possible-case cost. Instead, the risk premium is applied cumulatively to the entire subtree for which a currently-considered operation is the root node, and, like risk premiums computed for insurance policies in the insurance industry, is meant to provide an honest cost increment to reflect overall performance of the risky operation in a variety of different query-execution plans. Indeed, there will be cases in which the risky operation proves deleterious, just as, out of several thousand insured drivers, several will most certainly have serious accidents. However, by using risk-premium-based query optimization, prudent choices will be made in order to lower the overall consequences and disadvantages of using risky operations, just as, by charging risk premiums for risky drivers, an insurance company can manage to stay in business while providing insurance to a broad clientele.

Although the present invention has been described in terms of particular embodiments, it is not intended that the invention be limited to these embodiments. Modifications will be apparent to those skilled in the art. For example, risk-premium-based query optimization may be implemented, in various different database query-execution planners and query optimizers, in many different ways by varying familiar programming parameters, including modular organization, data structures, control structures, variables, programming languages, and underlying operating systems and hardware in which the implementations are executed. A variety of different ways of computing risk premiums for database operations may be employed, from simple numerical estimates based on historical data to sophisticated risk-premium estimation methods carried out in the context of a particular query-execution plan in which the cost of a database operation is being estimated. In various alternative embodiments of the present invention, the interactions and cumulative effects of applying multiple, related risk-premiums to operations within query trees may be considered. For example, a particular risk premium may be applied only once in a query-execution plan for a particular table, or risk premiums may be discounted under certain circumstances in which cumulative risk-premium application might overestimate the riskiness of a particular operation. As an analogy, risk premiums for members of insured groups may be lower than risk premiums charged to individual policy holders by an insurance company.

The foregoing description, for purposes of explanation; used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A database management system comprising:
one or more computer systems;
a database-management system encoded as instructions in one or more computer readable media within the one or more computer systems and executed by the one or more computer systems, the database-management system including a query-execution-plan-compilation component that:
   selects an operation, based on a cost estimate for using the operation from among two or more equivalent operations for use in a query-execution plan by applying a risk premium to the cost estimate, for using the operation;
   selects one of two or more alternative query-execution plans for execution of a query based on a cost estimate for executing each alternative query-execution plan that includes one or more risk premiums associated with one or more operations included in the query-execution plan;
   determines a cost estimate for executing a query-execution plan, the cost comprising one or more of:
   an elapsed time for execution of the query-execution plan by the database management system;
   a time for which one or more components of the database management system is used to execute the query-execution plan; and
   an amount of one or more computational resources used to execute the query-execution plan, including memory, communications bandwidth, processor bandwidth; and
   wherein the risk premium is computed to reflect a potential underestimation of the cost for executing the database operation when underlying estimates of characteristics of tables to which the database operation is applied are incorrect.

2. The database management system of claim 1 wherein a risk premium for a database operation is a cost-estimate multiplier that reflects a risk associated with selecting the database operation for incorporation into a query-execution plan.

3. The database management system of claim 2 wherein the risk associated with selecting the database operation for incorporation into a query-execution plan reflects a risk that a cost estimate for execution of a query-execution plan that incorporates the database operation as a particular node in the query-execution plan may be less than the cost incurred by executing the query-execution plan.

4. The database management system of claim 1 wherein the risk premium for a particular database operation is applied to an estimated cost of executing the database operation as well as all database operations that are executed according to the query-execution-plan prior to execution of the particular database operation.

5. A method for evaluating an execution cost of a particular database operation within a query-execution plan encoded as computer instructions in a computer-readable medium, the method comprising:
estimating the costs of executing all database operations according to the query-execution-plan the cost comprising one or more of:
an elapsed time for execution of the query-execution plan by the database management system;
a time for which one or more components of the database management system is used to execute the query-execution plan; and
an amount of one or more computational resources used to execute the query-execution plan, including memory, communications bandwidth, processor bandwidth;
estimating the cost of executing the particular database operation;
combining the estimated costs of executing all database operations that are executed prior to the particular database operation according to the query-execution-plan and the estimated cost of executing the particular database operation to produce an intermediate cost estimate; and
applying a risk-premium multiplier to the intermediate cost estimate, wherein the risk premium is computed to reflect a potential underestimation of the cost for executing the database operation when underlying estimates of characteristics of tables to which the database operation is applied are incorrect.

6. The method of claim 5 applied to database-operation-nodes of a query-execution plan by a database-management system in order to evaluate a total cost of the query-execution plan.

7. The method of claim 5 applied to database-operation-nodes of a query-execution plan by a database-management system while constructing a query-execution plan by a database-management system.

8. The method of claim 5 wherein risk-premium-modified cost estimates are used only for comparing alternative database operations for inclusion in a next node of a query tree during query-tree construction.

9. The method of claim 5 wherein risk-premium-modified cost estimates are incorporated into query-plan cost estimates, and therefore propagate to higher-level-node cost estimations.

10. A tangible, non-transitory, machine-readable medium that stores machine-readable instructions executable by a processor for evaluating an execution cost of a particular database operation within a query-execution plan, the tangible, non-transitory, machine-readable medium comprising:
machine-readable instructions for a query-execution-plan-compilation component that, when executed by the processor, selects an operation, based on a cost estimate for using the operation, from among two or more operations for use in a query-execution plan by applying a risk premium to the cost estimate for using the operation, wherein a risk premium for a database operation is a cost-estimate multiplier that reflects a risk associated with selecting the database operation for incorporation into a query-execution plan, machine-readable instructions for a query-execution-plan-compilation component that, when executed by the processor, selects one of two or more alternative query-execution plans for execution of a query based on a cost estimate for executing each alternative query-execution plan that includes one or more risk premiums associated with one or more operations included in the query-execution plan
machine-readable instructions for a query-execution-plan-compilation component that, when executed by the processor, determines a cost estimate for executing a query-execution plan, the cost comprising one or more of:

an elapsed time for execution of the query-execution plan by the database management system;

a time for which one or more components of the database management system is used to execute the query-execution plan; and an amount of one or more computational resources used to execute the query-execution plan, including memory, communications bandwidth, processor bandwidth; and wherein the risk premium is computed to reflect a potential underestimation of the cost for executing the database operation when underlying estimates of characteristics of tables to which the database operation is applied are incorrect.

11. The tangible, non-transitory, machine-readable medium of claim 10, wherein the risk associated with selecting the database operation for incorporation into a query-execution plan reflects a risk that a cost estimate of a query-execution plan that incorporates the database operation as a particular node in the query-execution plan may be less than the cost incurred by executing the query-execution plan.

12. The tangible, non-transitory, machine-readable medium of claim 10 applied to database-operation-nodes of a query-execution plan by a database-management system in order to evaluate a total cost of the query-execution plan, while constructing a query-execution plan by a database-management system.

13. The tangible, non-transitory, machine-readable medium of claim 10 wherein risk-premium-modified cost estimates are used for comparing alternative database operations for inclusion in a next node of a query tree during query-tree construction.

14. The tangible, non-transitory, machine-readable medium of claim 10 wherein risk-premium-modified cost estimates are incorporated into query-plan cost estimates, and propagate to higher-level-node cost estimations.

15. The database management system of claim 1, wherein the query-execution-plan-compilation component is to select one of two or more alternative query-execution plans for execution of a query based on a cost estimate for executing each alternative query-execution plan that includes one or more risk premiums associated with one or more operations included in the query-execution plan.

16. The database management system of claim 1, wherein the cost estimate is based, in part, on a cardinality estimate of a given table to be used in the operation, and wherein the cost estimate is erroneous based on errors in the cardinality estimate.

17. The tangible, non-transitory, machine-readable medium of claim 10, comprising machine-readable instructions for a query-execution-plan-compilation component that, when executed by the processor, selects one of two or more alternative query-execution plans for execution of a query based on a cost estimate for executing each alternative query-execution plan that includes one or more risk premiums associated with one or more operations included in the query-execution plan.

* * * * *

UNITED STATES PATENT AND TRADEMARK OFFICE
CERTIFICATE OF CORRECTION

| | |
|---|---|
| PATENT NO. | : 8,898,142 B2 |
| APPLICATION NO. | : 12/322164 |
| DATED | : November 25, 2014 |
| INVENTOR(S) | : Awny K. Al-Omari et al. |

It is certified that error appears in the above-identified patent and that said Letters Patent is hereby corrected as shown below:

In the Drawings

In sheet 21 of 23, line 9 approx., delete "groupby" and insert -- group-by --, therefor.

In sheet 21 of 23, line 15 approx., delete "groupby" and insert -- group-by --, therefor.

In sheet 21 of 23, line 17 approx., delete "groupby" and insert -- group-by --, therefor.

In sheet 22 of 23, line 12 approx., delete "groupby" and insert -- group-by --, therefor.

In sheet 22 of 23, line 18 approx., delete "groupby" and insert -- group-by --, therefor.

In sheet 22 of 23, line 20 approx., delete "groupby" and insert -- group-by --, therefor.

In the Claims

In column 15, line 61, in Claim 4, delete "executed" and insert -- executed prior to execution of the particular database operation --, therefor.

In column 15, lines 62-63, in Claim 4, delete "prior to execution of the particular database operation." and insert -- . --, therefor.

In column 16, line 1, in Claim 5, delete "operations" and insert -- operations that are executed prior to the particular database operation --, therefor.

Signed and Sealed this
Fifteenth Day of September, 2015

Michelle K. Lee
*Director of the United States Patent and Trademark Office*